United States Patent [19]

Smith

[11] Patent Number: 4,630,314
[45] Date of Patent: Dec. 16, 1986

[54] METEOR BURST COMMUNICATION SYSTEM

[75] Inventor: Dale K. Smith, King County, Wash.

[73] Assignee: Meteor Communications Corporation, Inc., Kent, Wash.

[21] Appl. No.: 424,605

[22] Filed: Sep. 27, 1982

[51] Int. Cl.$^4$ .............................................. H04B 1/38
[52] U.S. Cl. ...................................... 455/52; 455/64; 455/69; 375/58
[58] Field of Search ...................... 455/64, 67, 56, 57, 455/49, 53, 88, 52, 69; 340/854, 855, 857, 861; 343/18 R, 18 D, 18 E; 375/58

[56] References Cited

U.S. PATENT DOCUMENTS 3,054,895  9/1962  Forsyth .................................. 455/63
4,277,845  7/1981  Smith et al. ........................... 455/52

OTHER PUBLICATIONS

Prototype Meteor-Burst Communication System, by Daniel N. March, Final Report, ERL Report No. 69-12, Aug. 8, 1969.
Meteor Burst Telemetry Test Program Test Report, Boeing Aerospace Co., Aug. 30, 1974.
Meteor Burst Telemetry Winter Test Program Test Report, Boeing Aerospace Co., May 15, 1975.
Meteor Trails: Better than Radio Relay for Data Acquisition, Western Union, Signal, Apr. 1979, p. 79.

Primary Examiner—Tommy P. Chin
Attorney, Agent, or Firm—Seed and Berry

[57] ABSTRACT

A meteor burst communication system utilizing a master station and a large number of remote stations. A master station transmits a probing radio signal which, when reflected from a suitably positioned meteor trail, is received by a remote station. The remote station verifies that the received signal is being transmitted by a master station and then decides whether to respond to the probing signal, depending upon an a number of internal factors, including whether it has data available to send and when it last transmitted data to the master station. The master station can also address specific remote stations or transmit messages to all remote stations simultaneously.

24 Claims, 18 Drawing Figures

METEOR BURST COMMUNICATION SYSTEM

TECHNICAL FIELD

This invention relates to radio frequency data communication systems, and more particularly, to an RF communication system in which a master station communicates with a plurality of remote stations by reflecting RF signals from meteor trails in the atmosphere.

BACKGROUND ART

A variety of radio communication systems have evolved having characteristics which, to a large extent, depend upon the propagation characteristics of the radio signals. Low-frequency (LF) and high-frequency (HF) radio signals propagate from one point to another by reflection from the ionosphere. As a result, LF and HF communication systems are capable of communicating messages over long distances. In contrast, very high-frequency (VHF), ultrahigh-frequency (UHF), microwave and higher frequency signals propagate essentially along line-of-sight paths. Thus, VHF, UHF and microwave communications over long distances are generally not possible without utilizing either one or more repeater stations located within sight of each other and the transmitting and receiving stations or by using satellites for relaying the signals. All of these aforementioned systems have limitations which limit their use in specific applications. For example, the use of satellite repeater stations is expensive and often impractical due to the limited number of such stations. Furthermore, the potential unavailability of repeater stations in the event of international hostilities makes VHF, UHF, microwave and higher frequency systems impractical for emergency message communications. While LF and HF systems do not require repeater stations for long-distance communication, the rate at which data can be transmitted using such systems is limited, and such systems are susceptible to interference from other stations. Also, atmospheric disturbances can have unfavorable effects on the ability of the radio waves to reflect from the ionosphere.

The disadvantages of conventional communication systems, some of which are discussed above, has led to the development of communication systems which utilize ionized electron trails created by meteors entering the atmosphere to reflect radio signals in the low VHF range. The meteors generally enter the atmosphere at a height of about 60 miles above the earth's surface, thus allowing long-range communication between stations at distances up to 1200 miles. These trails, called "bursts," are random, but predictable in number. In fact, billions of meteors large enough to give usable trails enter the atmosphere each day.

The typical meteor trail has a useful duration of from a few milliseconds to several seconds. During this time, information can be exchanged between two or more stations. Wait times between suitably located meteor trails can range from a few seconds to minutes, depending upon time of day, time of year, and system design factors. Hence, the transmission between stations consists of "bursts" of high data rate transmissions of tens to hundreds of characters, separated by relatively long periods of silence. One important by-product of the burst characteristic is the ability of many links to share a common transmission frequency, a feature important in data collection systems.

The exchange of information can be in either direction. It can consist of short messages, such as sensor data readout, coded messages of up to several hundred characters, test messages of a few words, or long messages achieved by splicing together the transmissions of successive bursts.

Although meteor communication systems can be used solely for communicating between two stations, it is most commonly used to communicate between a master station and a large number of spaced-apart remote stations. In standard radio communications between master and remote stations, whether or not meteor trails are used for propagation, the naming of the station being called is referred to as "polling." Where all remote stations hear the master station's poll all the time, each remote station replies as it is polled. This protocol prevents simultaneous transmissions to the master station. Two alternative protocols available for one-way or "simplex" communication systems work on exactly opposite principles. The first, time slicing, assigns a time slot to each remote station, which must transmit only during its time slot. The second technique, known as "popcorn," allows each remote station to transmit randomly. Each transmission is repeated several times on the theory that if two remotes transmit simultaneously, they will not transmit simultaneously on the second or third transmission. This technique requires that the total network data transmission time be small relative to the transmit time available.

Selection of an appropriate communications protocol for a meteor burst system is complicated by the intermittent and very short duration nature of the communications path between stations. Simplex systems are generally ruled out since both time slicing and popcorn protocols require the communication link to be available at known times. Therefore, the most common technique uses a process called "probing," where a master station continuously transmits a signal and remote stations continuously listen for the master station's signal. When a meteor trail occurs at the proper location, a remote detects the master's signal, thereby noting the existence of a usable communication link. The remote then transmits its data back to the master station utilizing the same meteor trail from which the probe was reflected.

For small meteor burst networks containing one master station and only a few remotes, the randomness of meteor trails provides a natural control protocol which allows each remote station to transmit whenever it receives a transmission from the master station. The result at the master station is a "popcorn" system, with transmissions from each remote being received randomly.

The natural control protocol inherent in a system employing even a few remotes does not work, however, under certain circumstances. For example, when remote stations are relatively close to the master station, a direct communication link can exist without the need for meteor trails. Under these circumstances, all remote stations in the direct link to the master station will respond to a probe simultaneously. Also, during sporadic electromagnetic radio conditions, large numbers of distant remote stations may receive transmissions from the master station simultaneously for long periods of time. Finally, when remote stations are located in close proximity to each other, they will all simultaneously receive transmissions from the master station reflected from the same meteor trail.

To overcome these and other problems, earlier meteor burst communication systems transmitted a probe containing an address unique to each remote station. Remote stations would thus be required to both receive the transmission from the master station and find its address in the probe before it transmitted a reply. The master station could thus select a remote station from which it wished to receive information until it responded with the appropriate data. This later technique is inherently inefficient because it may take a considerable period of time for a meteor trail to occur at the proper location to establish a communication link with a specific remote station. During this time, in which no information is being conveyed to or from the master station, other meteor trails exist which could be used to communicate with other remote stations. Instead of utilizing these other meteor trails, the master station continues to wait for a communication link to be established with a specific remote station.

The first meteor burst data acquisition system utilizing a large number of remote stations was the United States Department of Agriculture's Soil Conservation Service's snow pack telemetry "SNOTEL" system. The SNOTEL system contains over 500 remote stations. The remote stations measure various weather-related conditions over a wide area in the western states and transmit such information to a master station. The large number of remote stations used in this system made existing communication protocols too restrictive. For this reason, a dynamic variable group addressing structure was developed for the SNOTEL system in which several remote stations are assigned to one or more groups, with all stations in each group responding to the same group address. The number of remote stations in each group being simultaneously addressed varied with the number of bits in the address. Thus, a poll containing a larger number of address bits is more specific to a fewer number of remote stations. An address containing a few number of bits is more general and allows a larger number of remote stations to respond to the poll. For example, an address of "225" may allow only remote station no. 225 to respond to a poll. An address of "22" would allow remote stations nos. 220–229 to respond to the probe. Finally, an address of "2" would allow remote station nos. 200–299 to respond to the probe. This technique, known as "variable length addressing," is described and claimed in U.S. Pat. No. 4,277,845, issued to Smith et al.

Although the advantages of the variable length addressing technique allowed implementation of a system having a large number of remote stations, it nevertheless exhibited certain shortcomings. Perhaps the biggest problem with variable length addressing is the vulnerability of the remote stations to a master station failure. Specifically, a remote station has a limit to how many times it can transmit data in a given period of time without exhausting its battery. This limit is determined by the energy expended per transmission and the charge rate of the battery which, in the SNOTEL system, is accomplished by a solar charger. Master station failures sometimes allow the master station to transmit its poll but not detect replies from remote stations. As a result, the master station continues to attempt communication with remote stations in the selected group, and the remote stations in that group continue to reply to the probe without the master station acknowledging the reply and polling another group of remote stations. Another problem with the variable address technique results from the physical separation of remote stations in the same group. Remote stations in close proximity must be in different groups so that they will not simultaneously respond to the same meteor trail. Thus, addressing for the entire network of remote stations must be generated before the first remote can be deployed. Once a remote station is deployed, it can be reassigned to another group only by visiting the site. Finally, variable length addressing has not been totally effective in controlling spurious remote station replies. During noise and weak signal conditions, the signal received by a remote station from a master station contains too many errored bits, allowing it to detect the address of its group when, in fact, that address was not transmitted. This problem is magnified by the nature of variable length addressing because a larger number of remote stations are capable of responding to a probe as the number of bits in the probe's address is reduced. Thus, an errored bit in a short address is likely to affect a large number of remote stations. This results in a multitude of unsolicited remote station replies which interfere with replies from the intended remote station and which can excessively discharge the remote station's battery.

DISCLOSURE OF INVENTION

It is an object of the invention to provide a meteor burst communication system which efficiently utilizes available meteor trails without causing remote stations to interfere with each other.

It is another object to provide a remote station that cannot discharge its battery by excessive transmissions regardless of the operating condition of the master station or the noise content of the probe received at the remote station.

It is still another object of the invention to provide a meteor burst communication system in which remote stations can be physically deployed without regard to address assignments.

It is a further object of the invention to provide a meteor burst communication system which is capable of functioning with remote stations having different operating characteristics, depending upon the nature of the remote station site.

It is a still further object of the invention to provide a meteor burst communication system in which operating control of the system can be distributed between the master station and the remote stations.

These and other objects of the invention are provided by a meteor burst communication system having at least one master station and a large number of remote stations. The master station transmits RF probe signals which are used by the remote stations solely to detect the existence of usable meteor trail. Thus, the information content of the probing signal does not determine whether or not remote stations reply to the probe. Instead, each remote terminal decides whether it will respond to a received polling signal by considering a number of internal factors, including whether the remote station has data that it is ready to transmit. The remote station reply is also accomplished on a pseudo random basis, depending upon when it last replied to a polling signal and the characteristics of the polling signal as received by the remote station. The ability of all remote stations to respond to each probing signal if a communication link is established by a meteor trail maximizes the efficiency of the system. In spite of this efficiency, the random nature of the remote station replies reduces the interference between remote stations to a statistically low value. Allowing individual remote stations to determine when they should respond to a probe is contrary to conventional principles which dictate that a large number of communication terminals be under control from a single point to ensure coordination between the terminals. In determining whether to reply to a probing signal, the remote station also examines the condition of its battery so that it is not discharged by excessive transmissions if the probing signal contains excessive noise or the master station does not receive the remote station's reply. The remote station's ability to control its operation allows remote stations to be tailored to individual characteristics of the remote station site. Thus, remote stations transmitting more important data or stations having a battery of greater capacity can be programmed to transmit to a relatively larger number of probing signals than other remote stations. Although the master station's probing signal is normally used solely to establish the existence of a usable meteor trail, the probing signal can be provided with a coded signal that allows the master station to take control over the operation of the remote stations. Thus, for example, the master station can address individual remote stations, it may set the remote stations to the proper time and date, and it may perform tests on the remote station. The remote stations may also be programmed to transmit signals without first receiving a probing signal in the event of certain conditions of unusual urgency. Under these circumstances, the remote station continues to periodically transmit the urgent message.

BEST MODE FOR CARRYING OUT THE INVENTION

Figure 1:
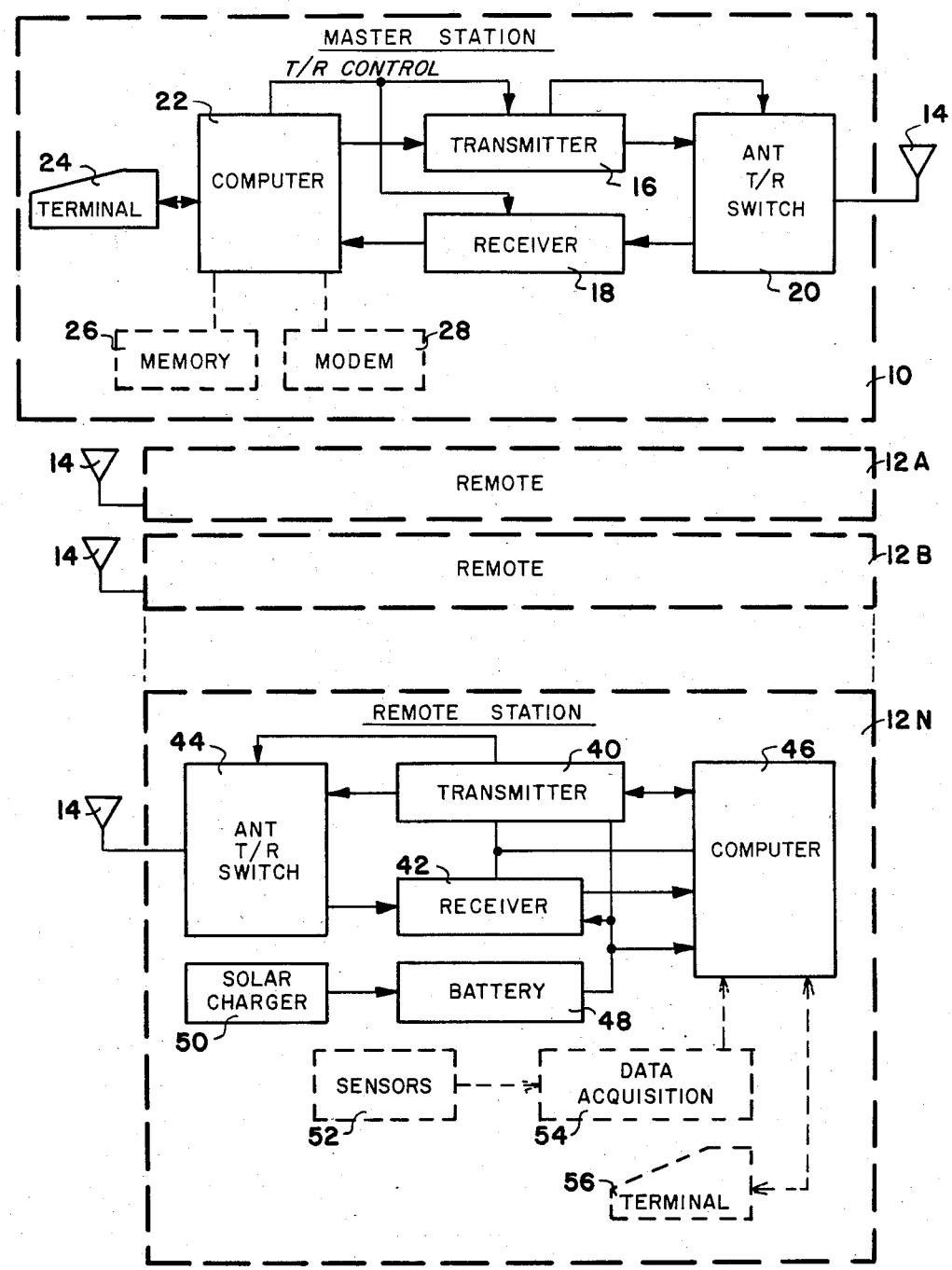
FIG. 1 is a block diagram of a meteor burst communication system.

The meteor burst communication system, as illustrated in FIG. 1, includes one or more master stations 10 and a plurality of remote stations 12a,b ... n. The master station 10 and remote station 12 receive and transmit messages through respective antennas 14 of conventional design. The basic components of the master station are an RF transmitter 16, preferably operating in the low VHF range, an RF receiver 18, an antenna transmit/receive switch 20 alternately connecting the transmitter 16 and the receiver 18 to the antenna 14, and a computer 22 of conventional design receiving incoming messages from the receiver 18, applying outgoing messages to the transmitter 16, and controlling the operation of the transmitter 16, receiver 18, and antenna switch 20 through the transmitter 16. In full duplex systems, transmit/receive switch 20 is replaced with duplex filters to allow simultaneous transmit and receive operations. The computer 22 receives and applies information to and from a terminal 24 of conventional design. The computer 22 may also store information in a bulk memory device 26, such as a floppy disc, or it may transmit and receive information over the telephone lines through a conventional modem 28. The computer 22 controls the operation of the master station 10 in accordance with a set of instructions described in greater detail hereinafter. Basically, it transmits an RF digital probing signal, receives and processes any reply to the probing signal or other signal transmitted by the remotes, and transmits acknowledgements to remote stations upon receipt of signals from remote stations.

The remote station 12n is configured in similar manner to the master station 10 insofar as it also receives and transmits messages under computer control. Accordingly, the remote stations 12 include respective transmitters 40 operating at the same frequency as the receiver 18 of the master station 10, and an RF receiver 42 operating at the same frequency as the transmitter 16 of the master station 10. The transmitter 40 and receiver 42 are alternately connected to the antenna 14 by a conventional antenna transmit/receive switch 44. A computer 46 receives decoded probing signals and incoming messages from the receiver 42 and applies outgoing messages to the transmitter 40 in response thereto. The computer 46 also controls the operation of the transmitter 40, receiver 42, and antenna switch 44 through the transmitter 40.

In contrast to the master station 10 being located in a populated area, the remote stations 12 will often be deployed in unpopulated areas away from any source of commercial electric power. Accordingly, power is supplied to the computer 46, transmitter 40, and receiver 42 by a conventional battery 48 that is charged during the daytime by a conventional solar charger 50. The capacity of the battery 48 is selected to supply sufficient power to receive and transmit messages during the evenings and cloudy periods, while the solar charger 50 is provided with sufficient capacity to supply power and charge the battery 48 during sunny periods. The capacities of the battery 48 and solar charger 50 will, of course, principally depend upon the power requirements of the transmitter 40 and its duty cycle.

The reply sent by the remote station 12 to the master station's probing signal will generally contain information, the characteristics of which wil depend upon how the remote stations 12 are used. In some cases, such as in the SNOTEL system, the remote stations 12 are used to measure physical characteristics, such as snow pack, and convey this information to the master station 10. These remote stations 12 will include one or more sensors 52 of conventional design for measuring the physical variable. Thus, for example, the sensors 52 may measure the wind direction and velocity, temperature, daily rainfall, and depth or weight of the snow pack. The outputs of the sensors 52 are applied to a data acquisition circuit 54 which conditions the sensor outputs before they are applied to the computer 46. When the remote station 12n receives a probing signal from the master station 10 and decides to reply to it, the reply will then contain coded signals indicative of the outputs of the sensors 52. The remote stations 12 may also be used as a data communication terminal, in which case the computer 46 will be connected to a conventional terminal 56, which, like the terminal 24 of the master station 10, contains a keyboard as well as a printer and- /or CRT display. The terminal 56 allows two-way communication with the terminal 24 of the master station 10.

Figure 2:
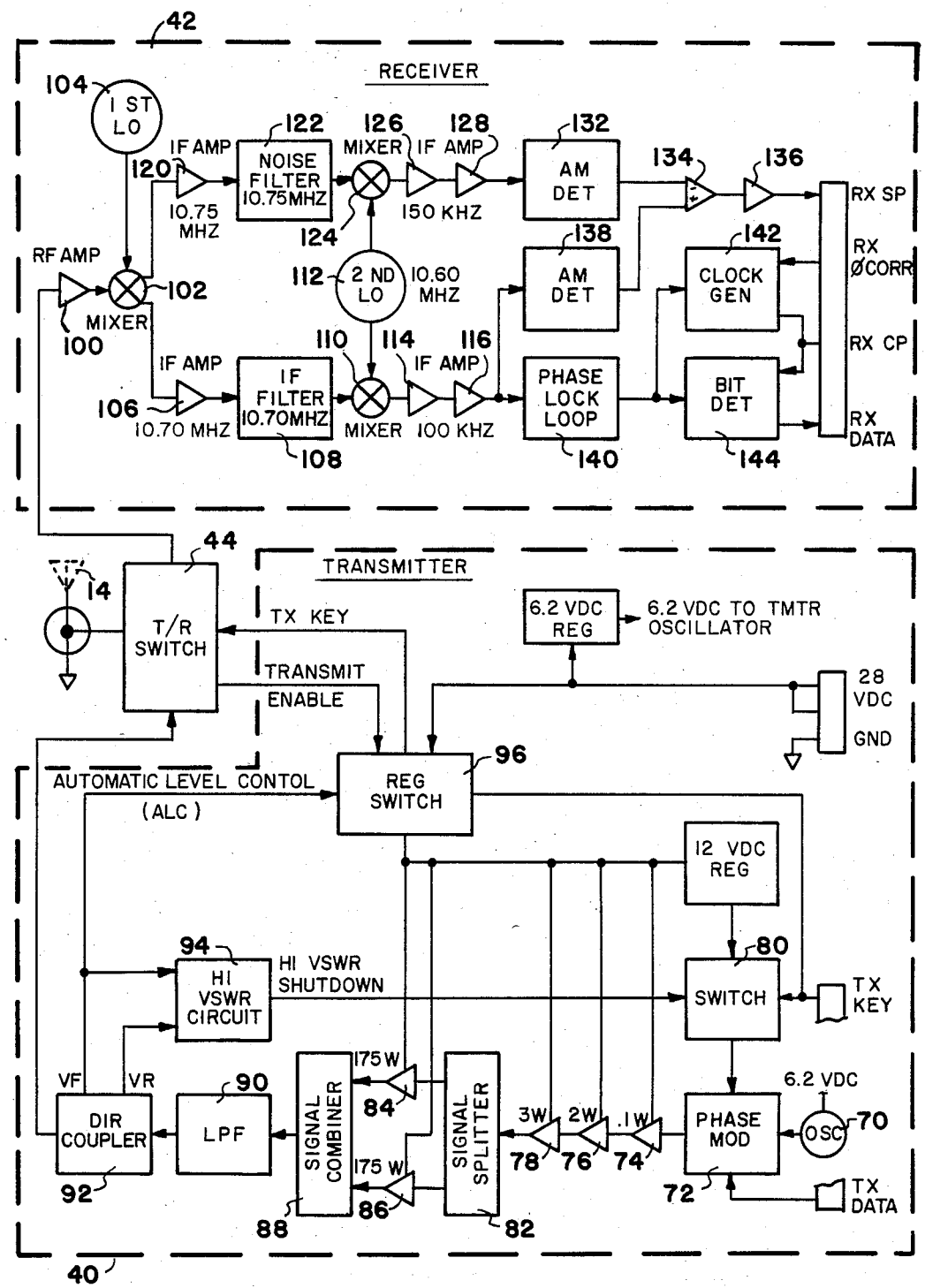
FIG. 2 is a block diagram of the transmitter and receiver used in a remote station of the meteor burst communication system.

The transmitter 40, which is shown in block diagram form in FIG. 2, is a complete 300-watt, phase shift-keyed (PSK) modulated transmitter. Briefly, it consists of a low-power, third-overtone crystal oscillator 70 of conventional design, a conventional VHF30 /−, 90° linear phase modulator 72 phase modulating the output of the oscillator 70 by the transmit data (Tx DATA). The modulated carrier at the output of the modulator 72 is boosted by three stages of solid-state power amplifiers 74,76,78 to levels of 0.1 watt, 2 watts, and 3 watts, respectively. The phase modulator 72 is keyed by a conventional keying switch under control of the transmitter key input (Tx KEY). The 3-watt signal at the output of power amplifier 78 is applied to a conventional signal splitter 82 which generates two equally phased signals, each at about 1.5 watts. The signal splitter is used to divide the applied signal into two smaller signals so that these signals can be boosted by commercially available power stages before being recombined. This is necessary because single 300-watt, solid-state power amplifiers are not commercially available. The signals from the signal splitter 82 are thus each boosted to about 175 watts by respective power amplifiers 84,86. The two 170-watt signals are then combined in a conventional signal combiner 88, thus producing a signal at the output of the combiner 88 of about 350 watts. If either of the power amplifiers 84,86 fails, the transmitter will still operate, although at 50% power. The signal at the output of the signal combiner 88 passes through a low-pass filter 90 used to reduce the harmonics of the output signal, thus enabling the transmitter to meet FCC requirements on spurious transmissions. Finally, the signal is applied to the transmit/receive switch 44 through a directional coupler 92. The insertion losses of the low-pass filter 90 and directional coupler 92 reduce the power applied to the T/R switch 44 to about 300 watts. The directional coupler 92 is of the dual-port variety that measures the forward and reflected power of the signal applied to the T/R switch 44. The coupler outputs $V_f$ and $V_r$ are used to measure the voltage standing wave ratios (VSWR) of the antenna. As explained in greater detail below, if the VSWR exceeds a 3.0:1 ratio, the transmitter is shut down, thereby preventing the transmitter from outputing into a low-impedance or open circuit. This protects the output stages of the power amplifiers 84,86 from catastrophic failure. The VSWR is calculated in circuit 94, which may be merely a conventional operational amplifier generating a logic level whenever the reverse voltage $V_r$ is greater than or equal to one-half the forward voltage $V_f$. The high VSWR shutdown signal at the output of circuit 94 disables switch 80 by shunting the Tx KEY input to ground, thereby gating off the phase modulator 72. The power amplifiers 74,76,78,84,86 receive power from a voltage regulator 96 that controls the supply voltage of the power amplifiers in a manner to maintain a constant RF output power level. Thus, the output power of the transmitter 40 is constant, regardless of variations in the voltage of the battery 48, component aging, and the ambient temperature. The regulator 96 is switched on by the Tx KEY input from the computer 46. The regulator switch 96 can also be disabled by the absence of a transmit enable signal from T/R switch 44 when the regulator 96 applies a Tx KEY signal to the switch 44.

Basically, the Tx KEY signal forward biases switching diodes, and the current flowing through the switching diodes generates the transmit enable signal. Thus, the absence of a transmit enable signal in the presence of a Tx KEY signal indicates failed diodes. In response, the regulator 96 removes power to the power amplifiers 74–78,84,86 so that the transmitter 40 does not transmit when the T/R switch is not in the transmit mode. Once the regulator 96 is enabled by the Tx KEY signal from the computer 46 and a transmit enable signal from the T/R switch 44, the regulator 96 applies power to the power amplifiers 74–78,84,86. The increasing power generated by the power amplifiers 84,86 is sampled at the $V_f$ output of the directional coupler 92. The voltage $V_f$ is compared to a fixed reference in regulator 96 and used to adjust the voltage applied to the power amplifiers 74–78,84,86 to maintain the voltage $V_f$ constant.

In summary, the transmitter 40 generates a VHF RF signal at about 300 watts that is phase modulated by the Tx DATA signal whenever (1) the computer 46 generates a Tx KEY signal, (2) the transmit/receiver switch 44 is enabled, thus generating a transmit enable signal, and (3) the intent of VSWR is less than 3.1:1.

When the T/R switch 44 is not in the transmit mode, the antenna 14 is applied to the receiver 42. The receiver consists of a double-conversion, crystal-controlled, RF/IF front end, a phase-lock loop phase demodulator, a clock recovery circuit, and an integrate and dump, matched post-detect filter. More specifically, the received signal is boosted by a conventional RF amplifier 100, such as a tuned, field-effect transistor, cascade amplifier. A cascade amplifier configuration is preferred since it makes alignment easier by reducing the interaction of input/output tuned circuits. At the same time, good signal handling capability and low noise operation are provided by use of field-effect transistors. The output of the RF amplifier 100 is applied to a conventional mixer 102 driven by a local oscillator 104 having a frequency differing from the frequency of the probing signal by 10.7 mHz. The output of the mixer 102 is applied to two separate but substantially identical IF channels. One of the channels, termed the "signal channel," is tuned to the 10.7 mHz center frequency of the mixed down probing signal transmitted by the master station transmitter. The other IF channel, termed the "noise channel," is centered at 10.75 mHz. The signal channel amplifies the probing signal and noise mixed down to 10.7 mHz, while the noise channel amplifies only the noise mixed down to 10.75 mHz. The difference in amplitude of the signals in the signal and noise channels can then be used to detect the presence of a received signal regardless of the noise content of the received signal. The receiver threshold is thus independent of the magnitude of the receiver noise and depends only upon absolute signal power. The signal is applied to the signal channel through conventional IF amplifier 106 tuned to a center frequency of 10.7 mHz. A band-pass filter 108, also of conventional design, has a center frequency of 10.7 mHz and a relatively narrow pass band, such as about 3 kHz. The filter 108 is preferably implemented as a conventional monolithic crystal filter. The output of the filter 108 undergoes a second conversion in which it is mixed down to 100 kHz. For this purpose, a conventional mixer 110 receives the output of the IF filter 108 and a 10.6 mHz signal generated by a second local oscillator 112. The output of the mixer 110 is thus the probing signal mixed down to 100 kHz. The 100-kHz IF signal is then amplified by two conventional IF amplifiers 114,116 which boost the signal by about 40 db.

The noise channel is substantially identical in configuration to the signal channel. Accordingly, the output of the mixer 102 is applied to a conventional IF amplifier 120, which, unlike the IF amplifier 106, is tuned 50 kHz from the center frequency of the probing signal at 10.75 mHz. The output of amplifier 120 passes through a conventional 3 kHz IF band-pass filter 122 centered at 10.75 mHz. A mixer 124, substantially identical to the mixer 110, receives the 10.6 mHz signal from the second local oscillator 112 to mix the 10.75 mHz noise signal to a 150 kHz base band. Finally, this 150 kHz IF signal is boosted by conventional IF amplifiers 126,128. The gains of IF amplifiers 114,116 and IF amplifiers 126,128 can be adjusted so that the output of amplifier 116 is equal to the output of amplifier 128 in the absence of receiving a signal from the master station.

The IF signals at the outputs of IF amplifiers 116,128 are applied to conventional AM detectors 130,132, respectively. The AM detector may consist of a pair of matched hot carrier diodes connected in a conventional operational amplifier circuit. In the absence of a received signal, the output of AM detector 130 will be substantially equal to the output of AM detector 132. As a result, differential amplifier 134, to which their outputs are applied, will be substantially zero. However, in the presence of a received signal, the output of AM detector 130 will be substantially larger than the output of AM detector 132, thus causing comparator 134 to generate a positive output. A comparator 136 receives the output of the differential amplifier 134 and compares it to a variable reference voltage in order to determine the level of the RF signal necessary to cause the comparator 136 to output a high logic level. Comparator 136 generates a receiver-signal-present signal $R_xSP$ in the presence of a received signal.

The mixed down polling signal from amplifier 116 is also applied to a phase-lock loop demodulator 140 of conventional design. Basically, the phase-lock loop 140 outputs a series of inpulses representing the phase shifts in the phase shift keyed carrier signal. The amplitude of these impulses is proportional to the amount of phase shift, and their polarities are the same as the polarity of the phase shift. The phase-lock loop 140 drives a conventional base band demodulator consisting of a clock generator 142 and a bit detector 144. The clock generator 142 generates a clock signal for detecting the received data by first filtering and rectifying the pulses from the phase-lock loop 140. Because the frequency of the data phase-modulating the transmitted carrier is at 4 kHz, filtering and full-wave rectifying the VCO pulses produces a strong, 4-kHz harmonic. This harmonic is then applied to a band-pass filter having a 4-kHz center frequency in order to improve the signal-to-noise ratio. Finally, the filtered signal is divided by two to obtain a 2-kHz clock signal. The 2-kHz clock signal is applied to the received clock output ($R_xCP$) and to the bit detector 144. The bit detector decodes the incoming data by first deemphasizing the output of the phase-lock loop 140 with an integrator, thus producing noisy, "Manchester"-coded base band data. The Manchester data is then converted to non-return-to-zero data by demodulating it with the 2-kHz clock from the clock generator 142. This non-return-to-zero data is then detected utilizing an integrate-and-dump type of matched filter, with the 2-kHz clock from the clock generator 142 being used as the dump pulse. Finally, this detected non-return-to-zero data is sampled with a flip-flop to obtain the final received data stream, which is applied to the receiver data output ($R_x$ DATA). It will be understood, however, that the phase shift-keyed IF signal at the output of amplifier 116 can be recovered by other means well known to one skilled in the art.

The process of reconstructing the clock signal with the clock generator 142 creates a 180° ambiguity in the received signal. In other words, it is not possible to determine whether a given received signal is a logic "1" or a logic "0." As explained in greater detail below, the probing signal starts with a series of logic "1"s. If the computer 46 receiving the data $R_x$ DATA reads the first bits of the probing signal as "1"s, no correction is required. If a block of logic "0"s is detected, the clock is 180° out of phase. Under these circumstances, the computer generates a receiver phase correction signal $R_x\phi$ CORRECT, which, when applied to the clock generator, inverts the phase of the clock signal generated by the clock generator 142.

In summary then, when a remote station 42 detects a probing signal from a master station, the received signal present $R_xSP$ output goes high. The received data is then applied to the $R_x$DATA output and the 2-kHz clock correspond-to the data is applied to the $R_xCP$ output.

Figure 3A:
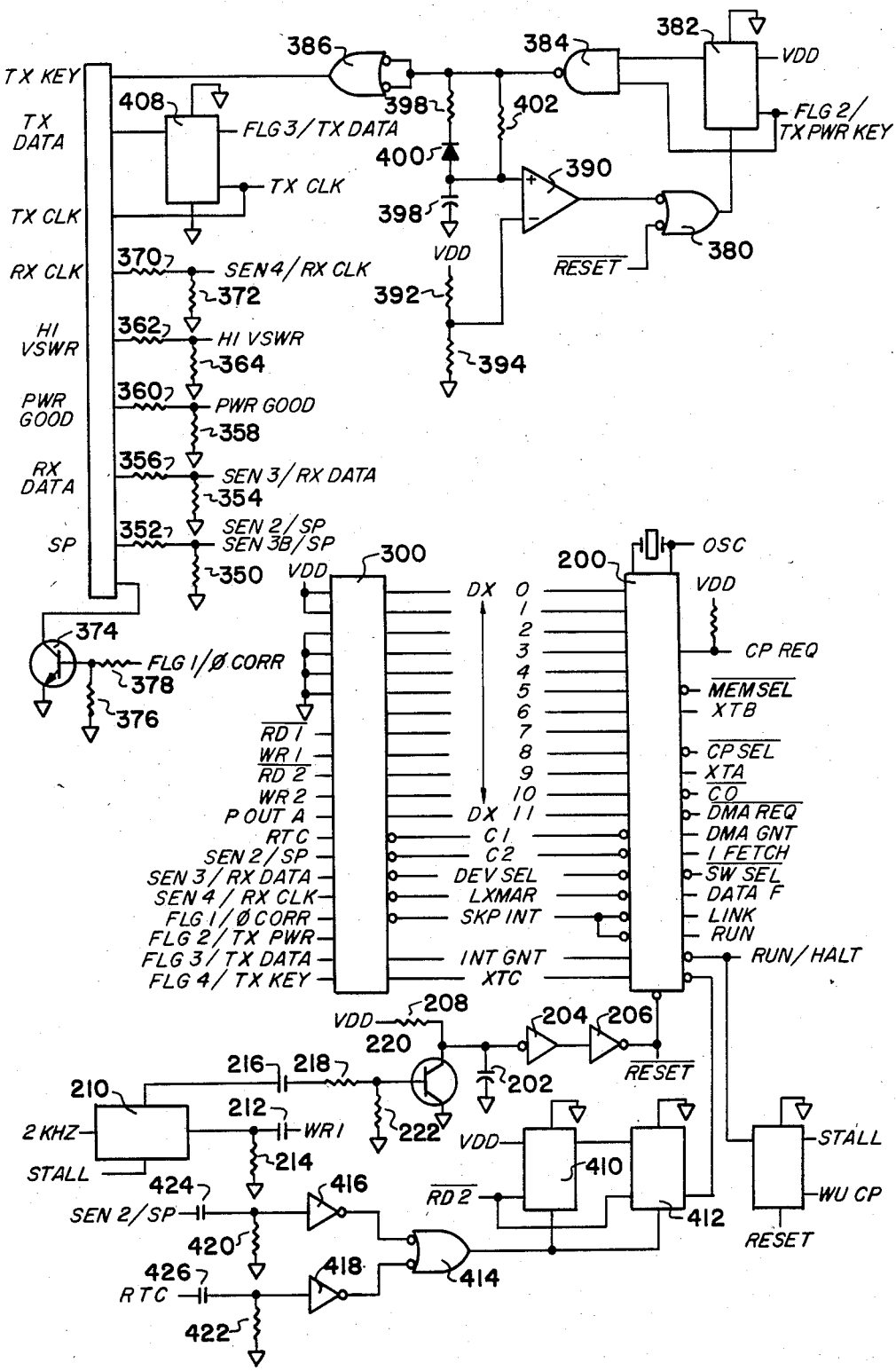
FIGS. 3A-3C are schematics of the computer used in the remote station.
Figure 3B:
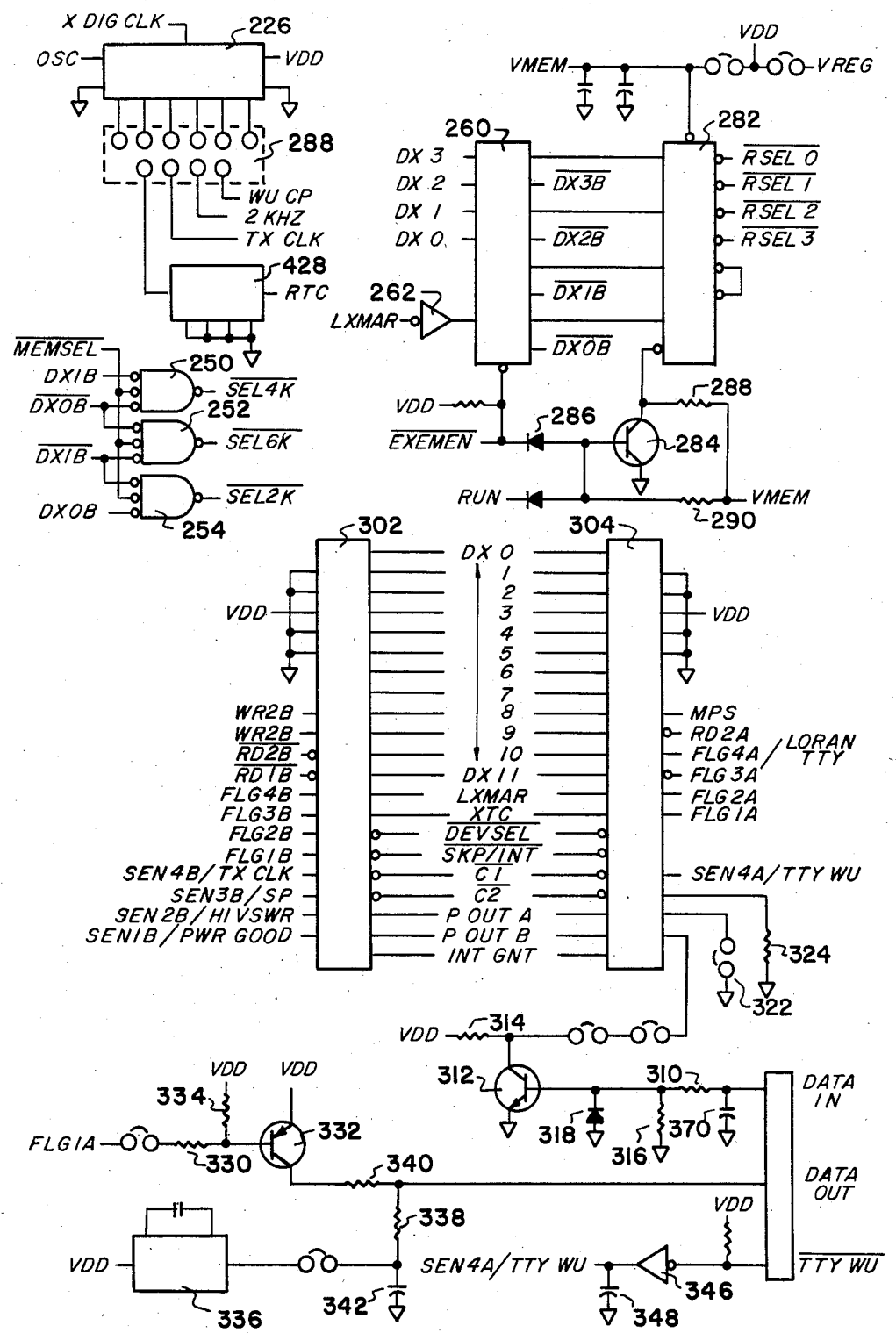
Figure 3C:
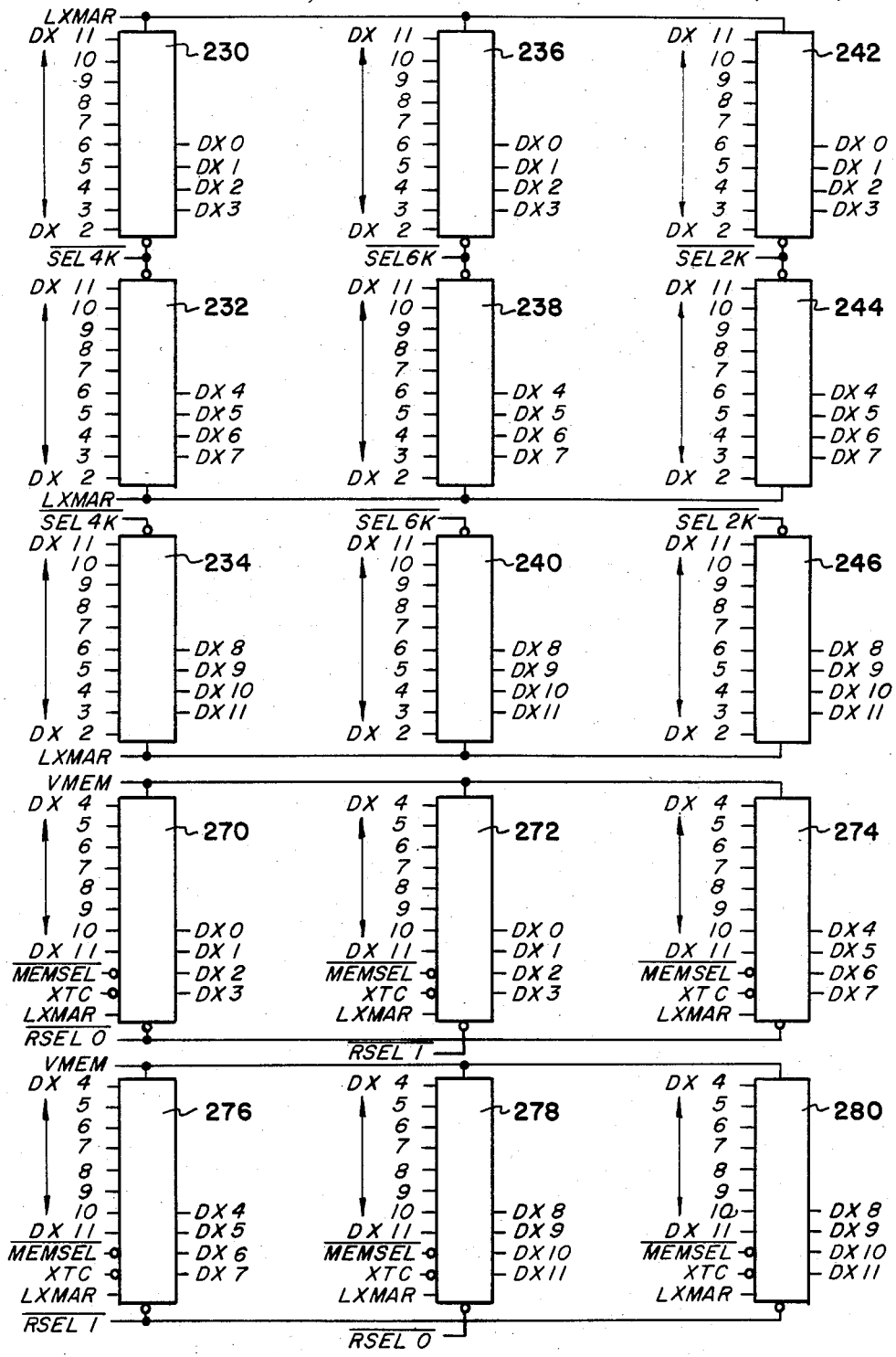

The computer 46, as illustrated in FIG. 3, is based upon a CPU 200 available from Intersil or Harris Semiconductor as Model IM6100. All data handling, I/O instructions, and receiver/transmitter operation are under control of the CPU 200. The CPU executes its functions via a tri-state, 12-bit, bidirectional data bus (DX0–DX11) and associated control lines. The information on the bus in interpreted as either input data, output data, I/O instructions, or peripheral device addresses, as determined by control lines MEMSEL, DEVSEL, $L_x$MAR, or XTC. An $L_x$M signal designates that the data on the data bus is a memory address, DEVSEL designates that the data on the data bus is an I/O instruction and "device address," and XTC designates the direction of data flow. A logic "0" on the XTC line inputs data to the CPU 200, and a logic "1" on the XTC line outputs data from the CPU 200.

The CPU 200 has full-vectored interrupt capability. A signal applied to the INT REQ input of the CPU 200 causes the CPU 200 to generate a signal on the INT GNT line. Thereafter, the ten most significant bits of the data bus are read by the CPU 200, causing the program to be vectored to the corresponding location.

As power is initially applied to the system, the $\overline{\text{RESET}}$ input to the microprocessor 200 is held low by capacitor 202 through inverters 204,206. As capacitor 202 charges through resistor 208, the $\overline{\text{RESET}}$ line goes high, thereby allowing the CPU 200 to begin executing the program described in greater detail below. The CPU 200 is also reset in the event that the program, for some reason, fails to continue running properly. Accordingly, a 2-mHz clock signal is applied to a counter 210 that is periodically reset by a WR1 pulse through capacitor 212. The WR1 pulse is indirectly generated by the CPU 200. The $\overline{\text{RESET}}$ input to the counter 210 is normally held low through resistor 214. If counter 210 increments to a pedetermined number before it has been reset by the WR1 pulse, a pulse applied through capacitor 216 and resistor 218 turns on transistor 220, thereby discharging capacitor 202. Discharging capacitor 202 brings the $\overline{\text{RESET}}$ input to CPU 200 low for a short period, thereby resetting the CPU. Transistor 220 is normally held at cutoff through resistor 222.

The 2-kHz clock, as well as other timing signals, are generated by a counter 226 from the CPU clock signal OSC. A terminal strip 228 allows the computer 46 to be configured depending upon specific operating characteristics of the system.

The program for operating the CPU 200 is stored in several erasable, programmable, read-only memories (EPROMS) 230–246. The EPROMS 230–246 are bit erasable and electrically reprogrammable. The address of a program instruction in EPROMS 230–246 is designated by the DX2–DX11 bits of the data bus and latched into the EPROMS 230–246 by the $L_xMAR$ signal. The EPROMS 230–246 are arranged in sets of threes, namely, 230–234, 236–240, and 242–246. The first EPROM 230,236,242 in each set outputs the first four bits of the data DX0–DX3, the second three EPROMS 232,238,244 of each set output the second four bits of the data bus DX4–DX7, and the remaining EPROMS 234,240,246 output the high-order bits DX8–DX11 of the data bus. Only one set of EPROMS 230–234, 236–240, or 242–246 is selected by a decoder formed by OR-gates 250,252,254. All of these gates 250–254 are enabled by a $\overline{MEMSEL}$ signal from the CPU 200 when the CPU 200 is selecting a memory device. Thus, the least significant ten bits, DX2–DX11, are used for decoding one 12-bit word out of 1024 blocks of memory, while the two most significant bits, DX0–DX1, are used for gating this 12-bit word out of the appropriate set. The most significant bits of the data bus also receive program instructions from the EPROMS 230–246. Accordingly, it is necessary to store the most significant bits, DX0–DX3, in latch 260 so that they are available to designate the particular set of EPROMS 230–246 to be addressed when the instruction appears on the bits DX0–DX11 of the data bus. Thus, the DX0–DX3 bits of the data bus are recorded in latch 260 when the $L_xMAR$ pulse is applied to the latch 260 through inverter 262. The most significant bits and their complements are then continuously present at the output of latch 260 and decoded by OR-gates 250–254 to select one of the sets of EPROMS.

A random access memory is composed of six 256×4 random access memory chips 270–280. The eight least significant bits DX4–DX11 of the data bus are used to select one 4-bit port on each memory element. The RAM chips 270–280 operate in two sets of three so that RAM chips 270,274,278 generate bits DX0–DX3, DX4–DX7, and DX9–DX11, respectively, when $\overline{RSEL0}$ is low. Similarly, RAM chips 272,276,280 operate together to output data on bits DX0–DX3, DX4–DX7, and DX8–DX11, respectively, when $\overline{RSEL1}$ is low. The RAM chips 270–280 are enabled from the latch 260 through the decoder 282 so that data can appear on the DX2 and DX3 bits of the data bus which select the desired RAM chip 270–278. The I/O port of each RAM chip 270–280 is bidirectional and under control of XTC. Data is written into the RAM chips 270–282 by bringing $L_xMAR$ high and then bringing XTC high. Pulling XTC low allows data to be read from the memory. Decoder 282 is enabled by $\overline{XME}$ $\overline{MEN}$ going high, thereby turning on transistor 284 through diode 286. The enable input, which is normally held high through resistor 288, is then pulled low. Transistor 284 is normally held at cutoff through resistor 290.

The principal interfaces between the central processing unit 200 and the transmitter 40, receiver 42, and data acquisition circuit 54 are parallel interface elements (PIE) 300,302,304. The parallel interface elements 300–304 receive their instructions from the central processing unit 200 through the data bus DX0–DX11. The PIEs 300–304 decode instructions from the CPU 200 and generate appropriate timing and control signals for the associated peripheral devices. A particular PIE 300, 302 or 304 is designated by hard wiring the SEL-3–SEL7 ports high or low. Each PIE 300–304 then compares this hard wired address with the address placed on DX3–DX7 by the CPU 200. Thus, PIE 300 is selected by DX3–DX7 being "01100" since ports SEL-3–SEL7 of PIE 300 is hard wired "01100." Upon recognition of its address, each of the PIEs 300–304 decodes the DX8–DX11 bits of the data bus as an instruction field. This instruction field is used to control the read, write, sense, and flag ports of the PIEs 300–304. The PIEs 300–304 can also be used for interrupting the CPU 200. Accordingly, upon receiving an INTGNT from the CPU 200, the PIEs 300–304 output a vectored address on the ten most significant bits, DX0–DX9, of the data bus. Data bits DX10 and DX11 are used to specify priority for the four interrupting sense lines.

Each PIE 300–304 has four flag output lines, four sense input lines, two write (WR) lines, and two read (RD) lines. The flag lines can be set high or low by the CPU 200 under program control. The sense lines can be programmed to detect either high or low levels, or positive- or negative-going pulses. In addition, the sense lines can be programmed to generate program-interrupt signals to the CPU 200. This allows external events to control the program execution.

The two read (RD) lines are negative pulses which strobe up to twelve bits of data from an external device into the CPU's accumulator. These pulses are generated by the PIEs 300–304 under program control.

The write (WR) lines are pulses which strobe up to twelve bits of data from the CPU's accumulator out to an external device. The WR lines can be programmed by the CPU 200 to be either positive or negative going, depending upon the requirements of the external device.

The first sense input SEN1 of PIE 304 receives data from a conventional RS-232-type test terminal through resistor 310 and transistor 312. The SEN1 line is normally held high through resistor 314, but, in the event that transistor 312 is turned on by a high bit on the data in line, the SEN1 line is turned low. Transistor 312 is held low in the absence of a high data in by resistor 316, diode 318 protects transistor 312 from excessively negative inputs, and capacitor 320 is provided for noise filtering. The remaining sense inputs, SEN2 and SEN3, are connected to ground by a removable jumper 322 and a resistor 324 to tailor the remote terminal to specific applications.

The first flag output FLG1A of the PIE 304 is applied through resistor 330 to transistor 332, which is normally held at cutoff by resistor 334. Transistor 332 is normally held at a negative voltage by voltage regulator 336 through resistors 338,340, with capacitor 342 being provided for noise immunity. The FLG1A output of PIE 304 is used to output data to the external, conventional RS-232-type test device (not shown) via the DATA OUT line. When the test device is connected to the remote terminal 12, the input to inverter 346 is grounded, thereby making the SEN4A line high to inform the CPU 200 via the PIE 304 that the test unit is connected to the remote terminal 12. Capacitor 348 is provided for noise rejection. The remaining inputs to and outputs from the PIE 304, as well as the inputs to and outputs from PIEs 300,302, are described in greater detail hereinafter.

The PIEs 300-302 are used to transmit data between the CPU 200 and the transmitter 40 and receiver 42. Accordingly, the third sense input SEN3B to PIE 302, which is normally held low through resistor 350, receives the signal-present signal $R_xSP$ from the receiver 42 through resistor 352. The third sense input SEN3 of the PIE 300, which is normally held low through resistor 354, receives the received data signal $R_x$ DATA from receiver 42 through resistor 356. The first sense input SEN1B to PIE 302, which is normally held low through resistor 358, is capable of receiving an indication of the acceptability of the transmitter power PWR GOOD through resistor 360. The high VSWR indication from the circuit 94 (FIG. 2) is applied to the second sense input SEN2B of the PIE 302 through resistor 362 and is normally held low through resistor 364. The transmitter key Tx KEY and transmitter clock Tx CLK are applied directly to the transmitter 40 from the flag output FLG4 of the PIE 300 and the counter 226 via terminal strip 228. The receiver clock $R_x$CLK is applied to the fourth sense input SEN4 of the PIE 300 through resistor 370, which is normally held low through resistor 372. The phase correction signal altering the phase of the clock generator 142 of the receiver 42 (FIG. 2) outputs from transistor 374, which is normally held at cut-off through resistor 376. Transistor 374 is turned on by the first flag output FLG1 of PIE 300 through resistor 378.

The transmit key Tx KEY and transmit data Tx DATA are generated from the PIE 300 in a somewhat more complex manner. Assuming that the output of NAND-gate 380 is low, a high is clocked to the Q output of flip-flop 382 by the leading edge of a Tx PWR KEY pulse from the second flag output FLG2 of PIE 300, thus causing NAND-gate 384 to output a low. NAND-gate 384 then applies a high to the Tx KEY output through inverter 386. The Tx KEY output will go low whenever either flip-flop 282 is reset or the Tx PWR KEY line goes low. Flip-flop 382 is reset when the $\overline{RESET}$ input to CPU goes low or whenever the output of comparator 390 goes low. Comparator 390 compares a voltage reference voltage generated by resistors 392,394 to the voltage at its positive input. When the output of NAND-gate 384 goes low in response to the leading edge of the Tx PWR KEY, capacitor 396 starts discharging through resistor 398 and diode 400. After a predetermined period, capacitor 396 is discharged below the voltage generated by voltage divider resistors 392,394, thereby causing the output of comparator 390 to go low, which resets flip-flop 382 through gate 380. Resetting flip-flop 382 causes the Tx KEY output to go low through AND-gate 384 and inverter 386. Thus, the capacitor 396, in combination with resistor 396, limit the maximum transmit time of the transmitter 40 by limiting the maximum width of the Tx KEY signal. When the output of NAND-gate 384 goes high, capacitor 396 charges through resistor 402, which, because it has a substantially higher impedance than resistor 398, causes capacitor 396 to charge relatively slowly. As a result, a relatively long Tx KEY output cannot be generated until a substantial delay has elapsed. The circuit thus limits the duty cycle of the transmitter 40. The transmit data Tx DATA is generated by the third flag output FLG3 of PIE 300 and is applied to the data input of flip-flop 408. The transmitter clock Tx CLK clocks the outgoing data to the Tx DATA input of the transmitter upon the leading edge of the transmit clock Tx CLK.

As mentioned above, the remote terminal 12 will usually be deployed in a remote location where power is not commercially available. Accordingly, it is important that the circuitry utilize as little power as possible. For this reason, the CPU 200 is programmed to enter an inactive condition if it is not necessary for processing to occur. The CPU 200 causes PIE 300 to generate a negative-going $\overline{RD2}$ pulse which sets flip-flop 410 and clocks a logic "0" from the Q output of flip-flop 410 to the Q output of flip-flop 412. The CPU 200 then checks the status of a large number of lines to determine if it needs to do any processing. If not, the CPU 200 causes the PIE 300 to generate an additional $\overline{RD2}$ low, which once again clocks flip-flops 410,412. Since the Q output of flip-flop 410 was high at the start of the second RD2 pulse, this high is then clocked to the Q output of flip-flop 412 so that the $\overline{Q}$ output of flip-flop 412 goes low. This low is applied to the $\overline{WAIT}$ input of the CPU 200, which places the CPU in an inactive, low-power mode in which only the internal oscillator is powered. The CPU 200 will remain in this low-power mode until flip-flop 412 is reset, thereby causing the $\overline{WAIT}$ to go high. Flip-flop 412 is reset by NAND-gate 414 whenever either of its inputs goes low. Flip-flop 412 is thus reset whenever a high is applied to the input of either inverter 416 or inverter 418, which are normally held low through resistors 420,422, respectively. The leading edge of the received signal present $R_xSP$ output of the receiver 42 is coupled through capacitor 424 to remove the CPU 200 from the inactive mode whenever the receiver detects a probing signal. The CPU 200 is also removed from the low-power, inactive mode whenever an RTC pulse is applied through capacitor 426 to inverter 418. The RTC pulse is periodically generated by counter 428, which receives a 1 kHz signal from counter 226 via terminal block 228. In summary, the CPU 200 will enter the low-power, inactive mode whenever processing of information is not required. It will exit from this low-power, inactive mode after a predetermined period unless it has previously exited from this mode because the receiver 42 has detected a probing signal from the master station.

Figure 4A:
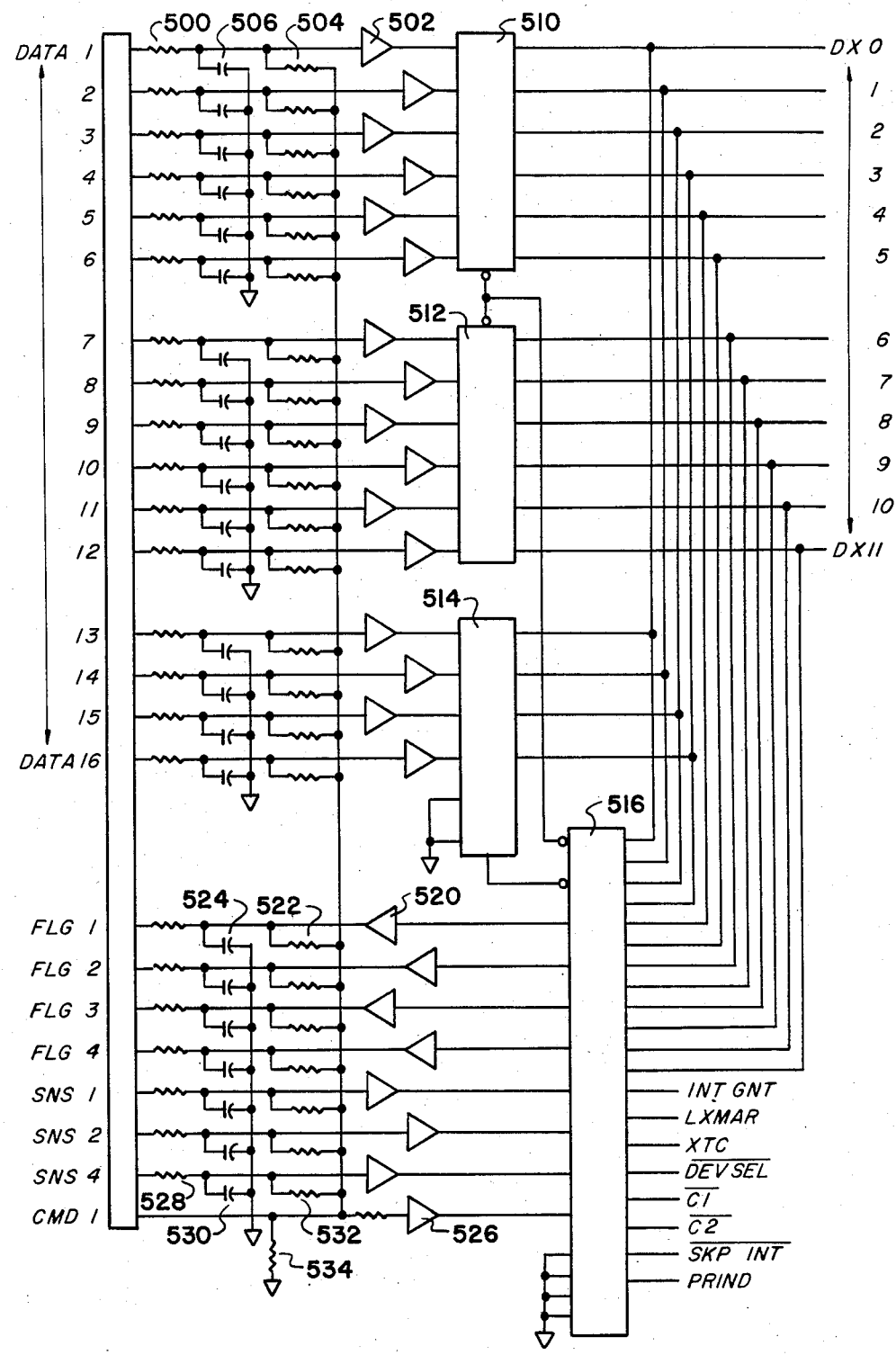
FIGS. 4A-4C are schematics of the data acquisition portion of the remote station.

As mentioned above, when the remote station 12 is used to measure various physical parameters at the remote station site and convey the measurements to the master station, a data acquisition unit 54 is required. The basic functions of the data acquisition unit 54 is to (1) convert sensor analog signals into digital data available for transmission to the master station, (2) convert internal test point analog signals into digital data available for self-test applications, (3) provide interfacing to external digital channel data, and (4) to provide the operator with a means of selecting an address for the remote station and the number of external data channels to be read. With reference to FIG. 4A, digital data channels 1-16 from the sensors are applied through respective resistors, designated generally at 500, to respective drivers 502. The inputs to the drivers 502 are pulled to the polarity of the CMD1 input through respective resistors 504. Finally, the inputs to the drivers 502 are filtered for noise immunity by respective capacitors 506. The outputs of the drivers 502 are applied to buffers 510,512,514, which selectively connect them to the data bus DX0-DX11. The buffers 510-514 are controlled by a parallel interface element 516 under control of the data bus. Buffers 510,512 are enabled by the RD1 output of the PIE 516, while buffer 514 is enabled by the RD2 output of PIE 516. The PIE 516 also generates outputs from its flag FLG ports through respective drivers 520 and resistors 522. These outputs are filtered by capacitors 524 to provide noisy immunity. The PIE 516 also receives inputs through its sense ports through drivers 526 and respective resistors 528. These inputs are filtered with capacitors 530 and biased to the CMD input through resistors 532. However, the CMD input is biased to ground through resistor 534. In this manner, the data bus causes the PIE 516 to apply digital inputs from the sensor to the data bus and it also generates outputs to the measuring devices and senses inputs from the devices.

Figure 4B:
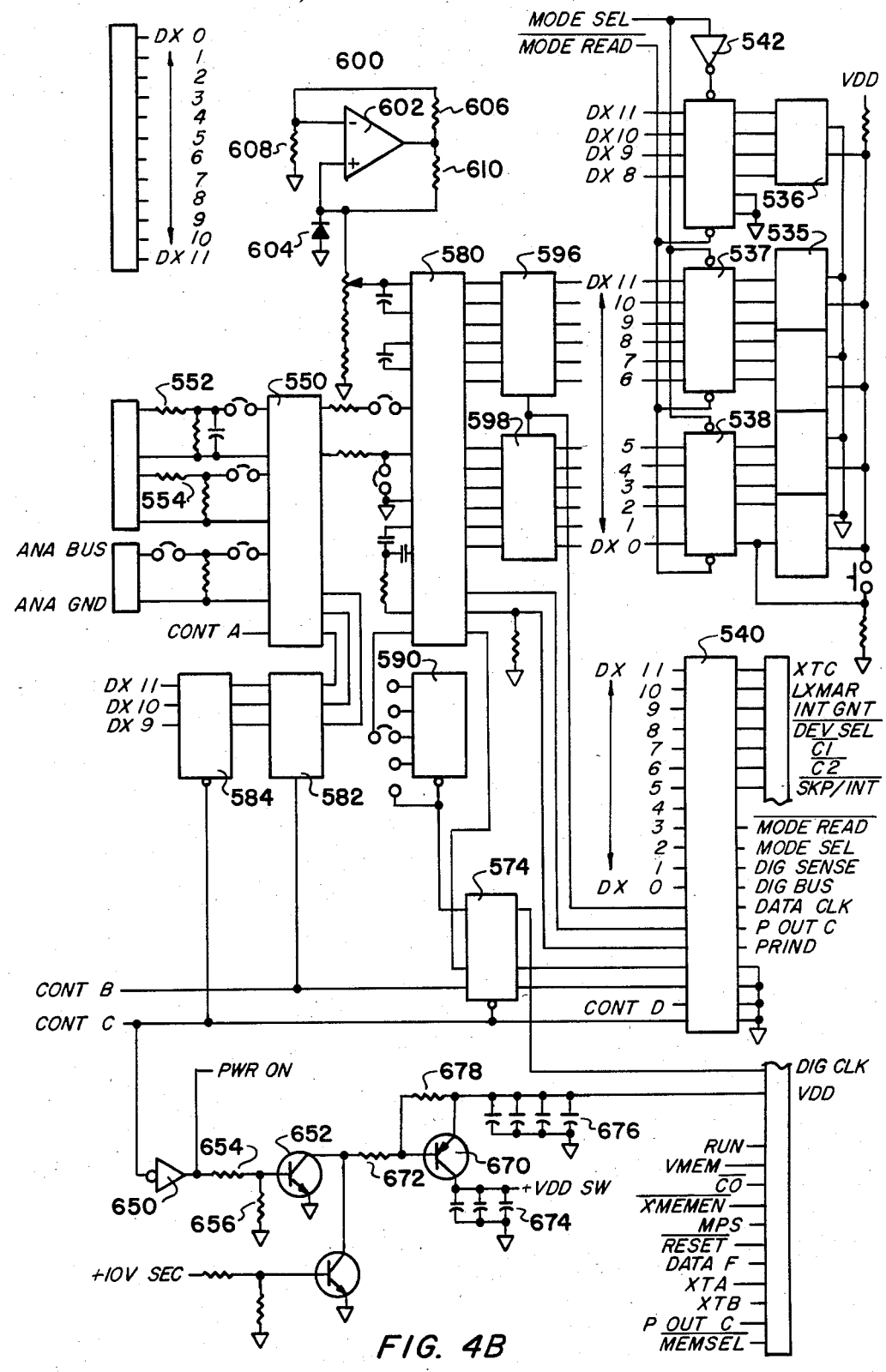
Figure 4C:
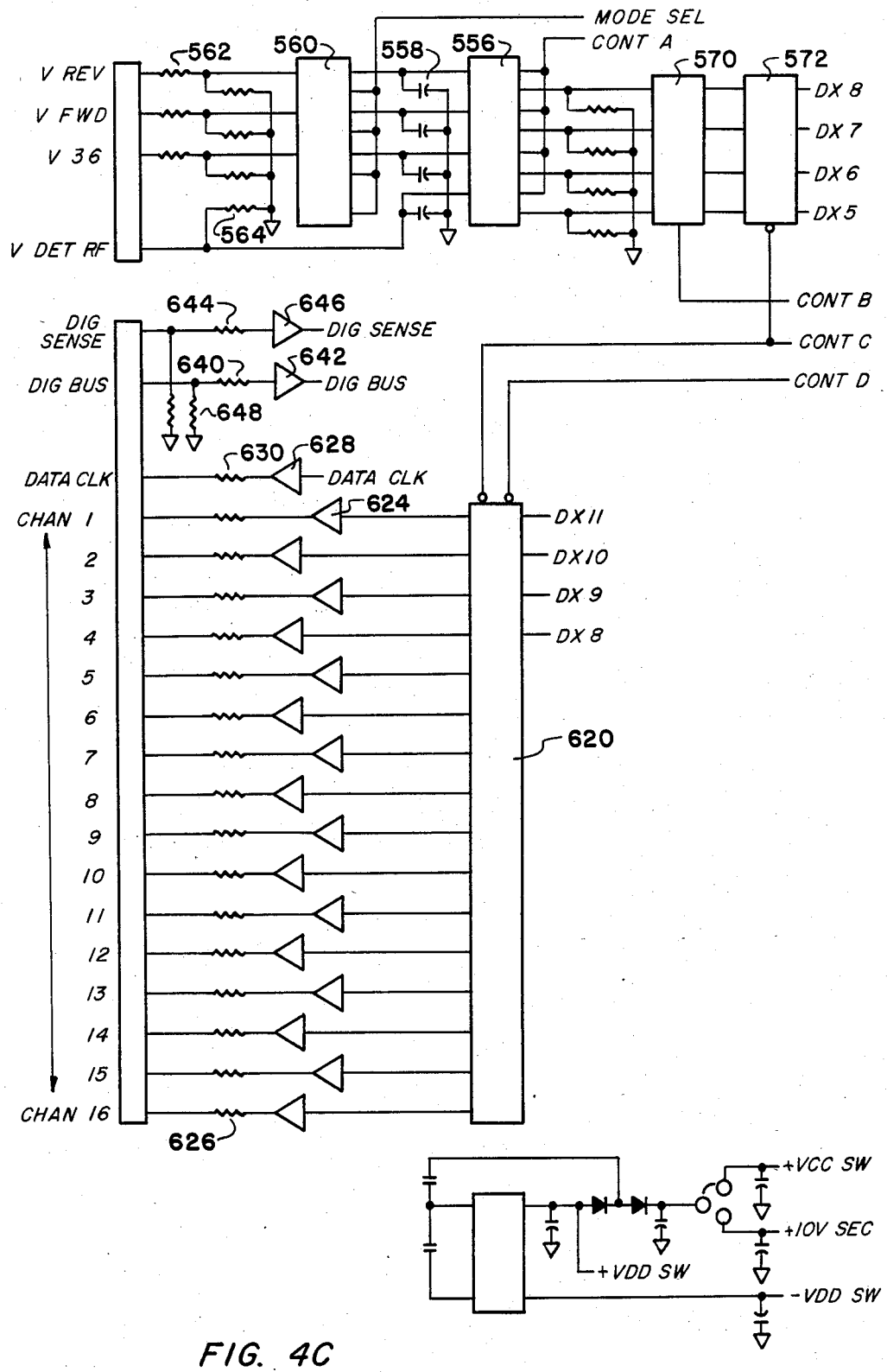

The remaining circuitry of the data aquisition unit 54 is illustrated in FIG. 4B. The address of the remote station is selected by a conventional thumb wheel switch 535 which generates a 10-bit address. A similar thumb wheel switch 536 designates the number of external data channels to be read. The outputs of the thumb wheel switch 535 are applied to buffers 537,538, while the outputs of the thumb wheel switch 536 are applied to a buffer 539. All of the buffers 537–539 are enabled by a MODE READ pulse generated at the RD2 output of a parallel interface unit 540. However, buffers 537,538 and buffer 539 are alternately enabled by a MODE SEL signal from the FL4 port of PIE 540, which is applied to buffer 539 through inverter 542. Thus, when MODE READ and MODE SEL are both low, the outputs of thumb wheel switch 535 are applied to the DX2–DX11 bits of the data bus. When MODE READ is low but MODE SEL is high, the outputs of thumb wheel switch 536 are applied to the DX8–DX11 bits of the data bus. In this manner, the CPU 200 can determine the address of the remote station when a specific remote station is being addressed by the master station and the CPU 200 can determine the number of external data channels to be read.

As mentioned above, one of the functions of the data acquisition unit is to convert analog signals into digital data. Accordingly, analog signals are applied to an analog multiplexer 550, either directly or through respective resistors 552,554 or from a buffer switch 556. Buffer switch 556 receives analog voltages from sample capacitors 558, forming part of a sample-and-hold circuit with switch 560. Switch 560 receives the VREV and VFWD signals from the transmitter 40, indicative of the reverse and forward power, as well as a V36 input indicative of the battery level, and a $V_{DET}$ RF input indicative of the RF level. These signals are applied to the switch 560 through respective resistors 562 and they are biased low through respective pull-down resistors 564. Upon a MODE SELECT pulse generated by the PIE 540, the switch 560 applies its inputs to respective sample capacitors 558 so that the capacitors 558 hold the sampled voltages after the MODE SELECT input goes low. The buffer switch 556 then sequentially applies each of the voltages on the respective capacitors 558 to one input of the multiplexer 550, as controlled by the outputs of a latch 570. Latch 570 stores the values on the DX5–DX8 bits of the data bus applied through buffer 572 when the second flag port of PIE 540 goes low. Latch 570 is enabled by the WR1 output of PIE 540 through buffer 574 and is normally held low through resistor 576. Multiplexer 550 connects one of its analog inputs to a conventional analog-to-digital converter 580 as determined by its address inputs from latch 582. Latch 582 receives the DX9–DX11 bits of the data bus from buffer 584. Buffer 584 is operated in parallel with buffer 572 by the second flag port of the PIE 540. Latch 582 is operated in parallel with latch 570 by the WR1 output of PIE 540 applied through buffer 574. Multiplexer 550 is also enabled by the DX11 of the data bus applied through latch 582. Thus, in operation, the data bus selects the one-of-four analog voltages from the transmitter to be applied to the multiplexer 550 and which of the inputs to the multiplexer 550 is applied to the analog-to-digital converter 510. This information on the data bus is first applied to the latches 570, 582 through the buffers 572,584 by the FLG2 output of PIE 540. PIE 540 then generates a high on its WR1 output which, because FLG2 is still low, is applied through buffer 574 to the latches 570,582. At this time, one of the analog inputs is then applied to analog-to-digital converter 510.

The A/D converter 510 is of the 12-bit, dual-slope, integrating type. An oscillator input is used to operate the A/D converter 510 and is provided by the CPU 200 through the DIG CLK input. This signal is applied through buffer 574 to a divider 590 which reduces its frequency to a lower, manually selected value. Data conversion is started by pulsing the A/D run line high from the FLG1 output of PIE 540 through buffer 574. When the analog-to-digital conversion has been completed, the normally high $\overline{STATUS}$ line goes low, thereby informing the CPU 200 through the SENS1 input of PIE 540 that valid data is available at the output of the A/D converter 510. The CPU 200 is then able to read this data through buffers 596,598 when they are enabled by an RD1 output of the PIE 540. The A/D converter requires a stable, temperature-independent reference voltage for accurate operation over a wide temperature range. This is provided using a reference voltage generator 600 consisting of an operational amplifier 602 generating an output which is matched to the voltage across a zener diode 604 by resistors 606,608 operating essentially as a voltage divider. The operational amplifier 602 provides a reasonably constant current source through resistor 610 so that the voltage across zener diode 604 is relatively constant.

Particular sensing devices are selected by signals generated through a one-of-sixteen decoder 620 from the DX8–DX11 bits of the data bus when the decoder 620 is enabled by the FLG2 output of PIE 540 and strobed by a WR2 output of PIE 540. Decoder 620 thus generates a high at one of its outputs, depending upon the four bits DX8–DX11 of the data bus. The outputs are applied through respective drivers 624 and isolation resistor 626. The data clock DATA CLK is also applied to the sensors through driver 628 and resistor 630. Analog data from the sensors is input to the data acquisition unit 54 through the analog bus, as described above. However, serial digital data from the sensors is input through resistor 640 and driver 642 to the digital bus DIG BUS. A digital sense input applied through resistor 644 and driver 646 is used to determine whether the selected sensor generates analog or digital information. Both of these inputs are biased low through pull-down resistors 648.

The final function of the data acquisition unit 54 is to control power to the data acquisition circuits. Accordingly, the FLG2 output of the PIE 540 is boosted by driver 650 and applied to transistor 654 through resistor 654. Transistor 652 is biased to cutoff through resistor 656. Transistor 652, in turn, controls the operation of transistor 670 through resistor 672. The collector of transistor 670 is connected to raw power and filtered by capacitors 674. Transistor 670, by operating in an emitter follower mode, provides a low output impedance source for power to the data acquisition circuits. The power output on the emitter of transistor 670 is filtered by capacitor 676. The transistor 670 is biased toward cutoff by resistor 678.

Figure 5:
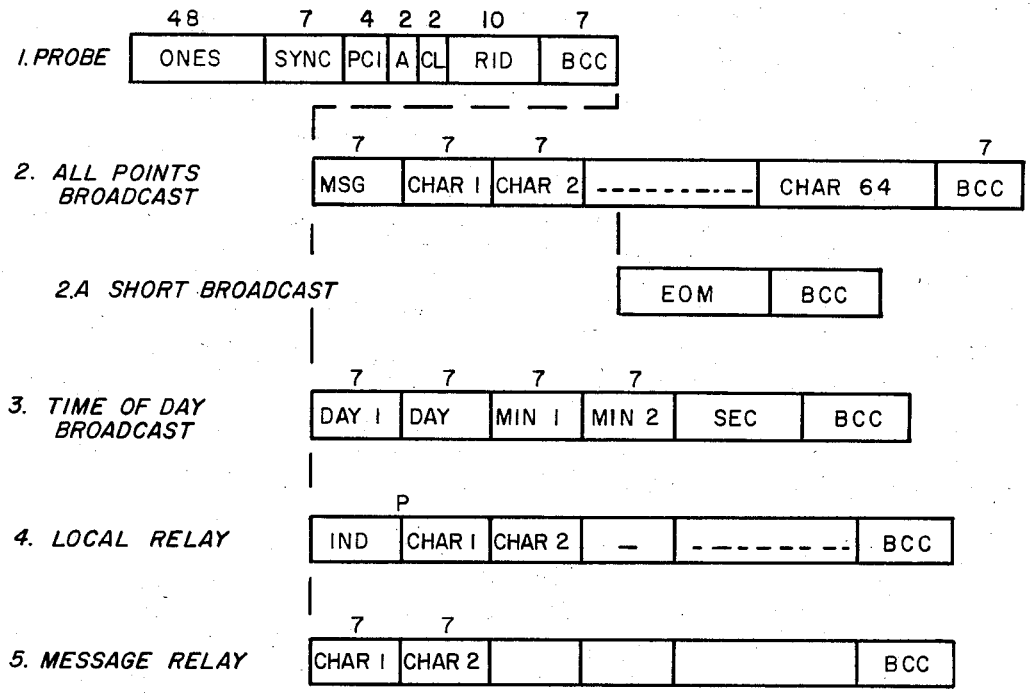
FIG. 5 is a diagram showing various master station probes and various remote station replies to such probes.
Figure 5:
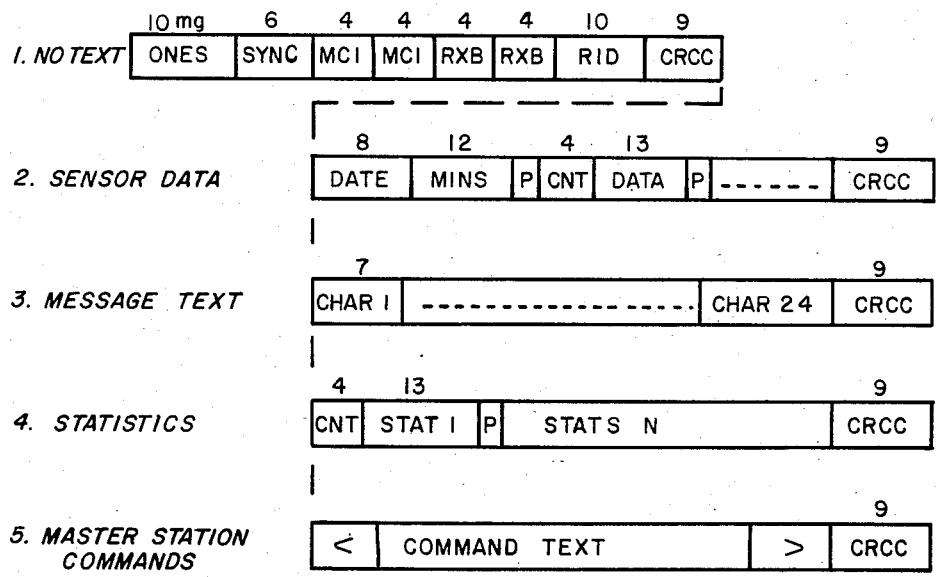
Figure 6A:
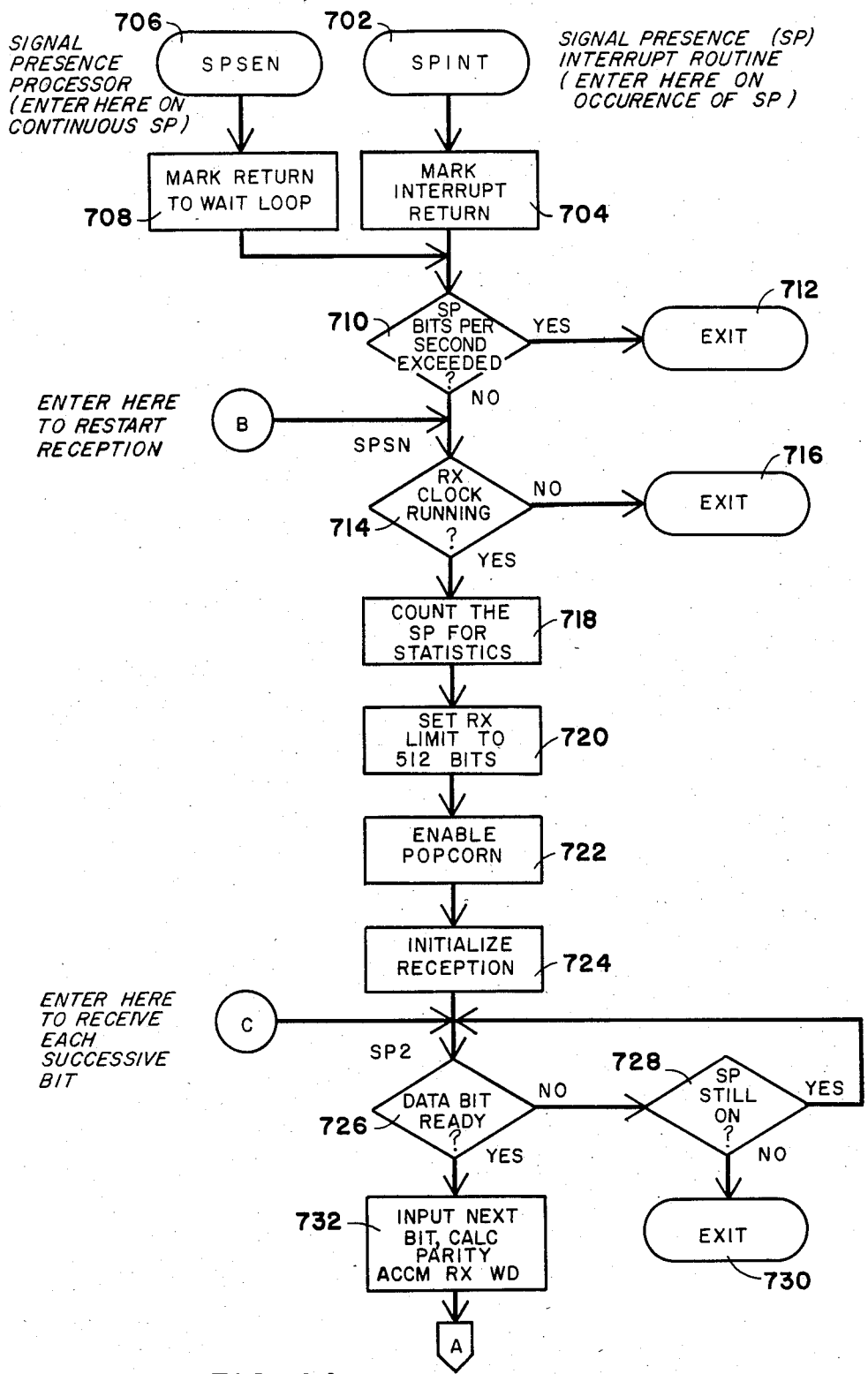
FIGS. 6A-6G are flow charts of the software for the remote station.
Figure 6B:
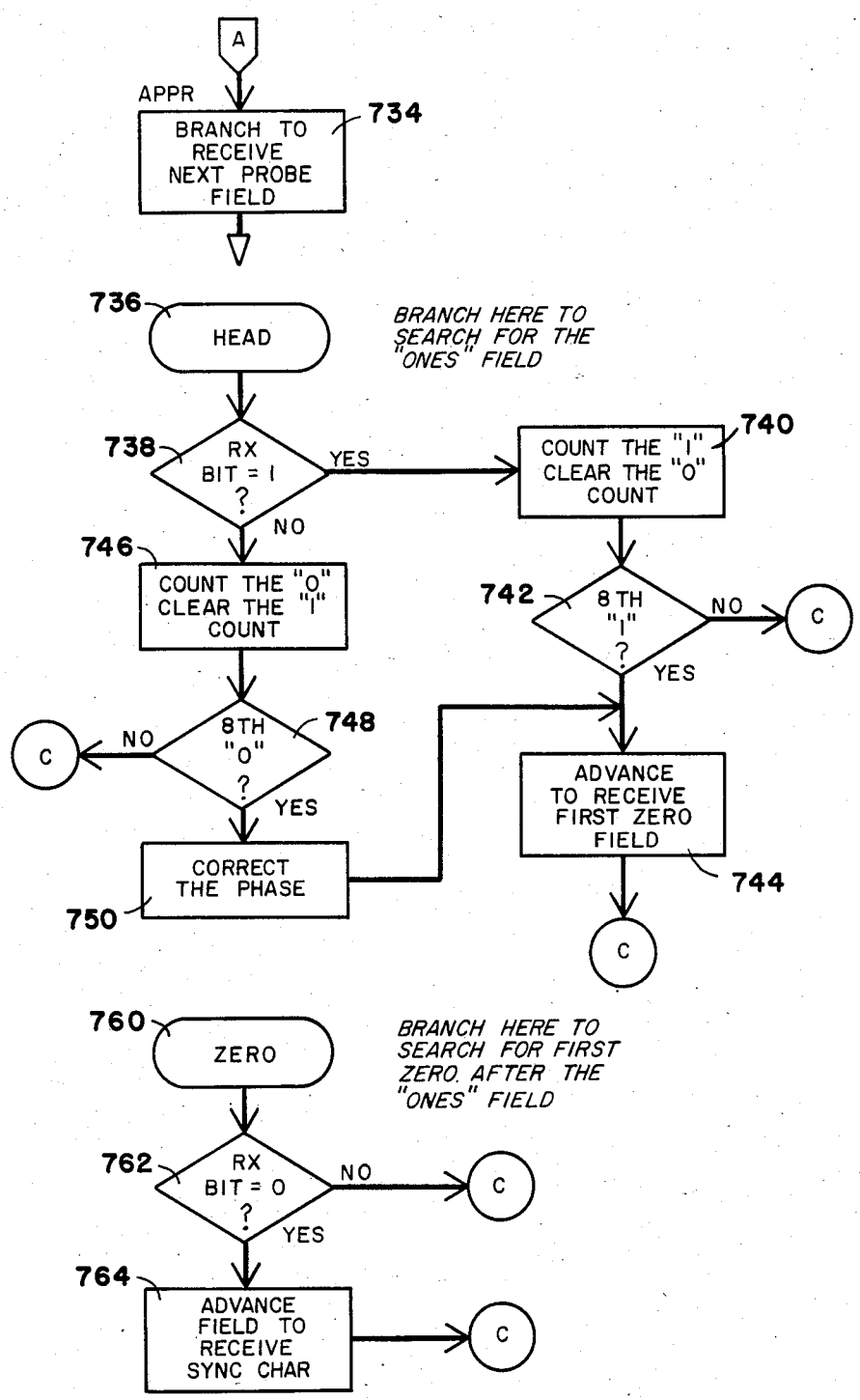
Figure 6C:
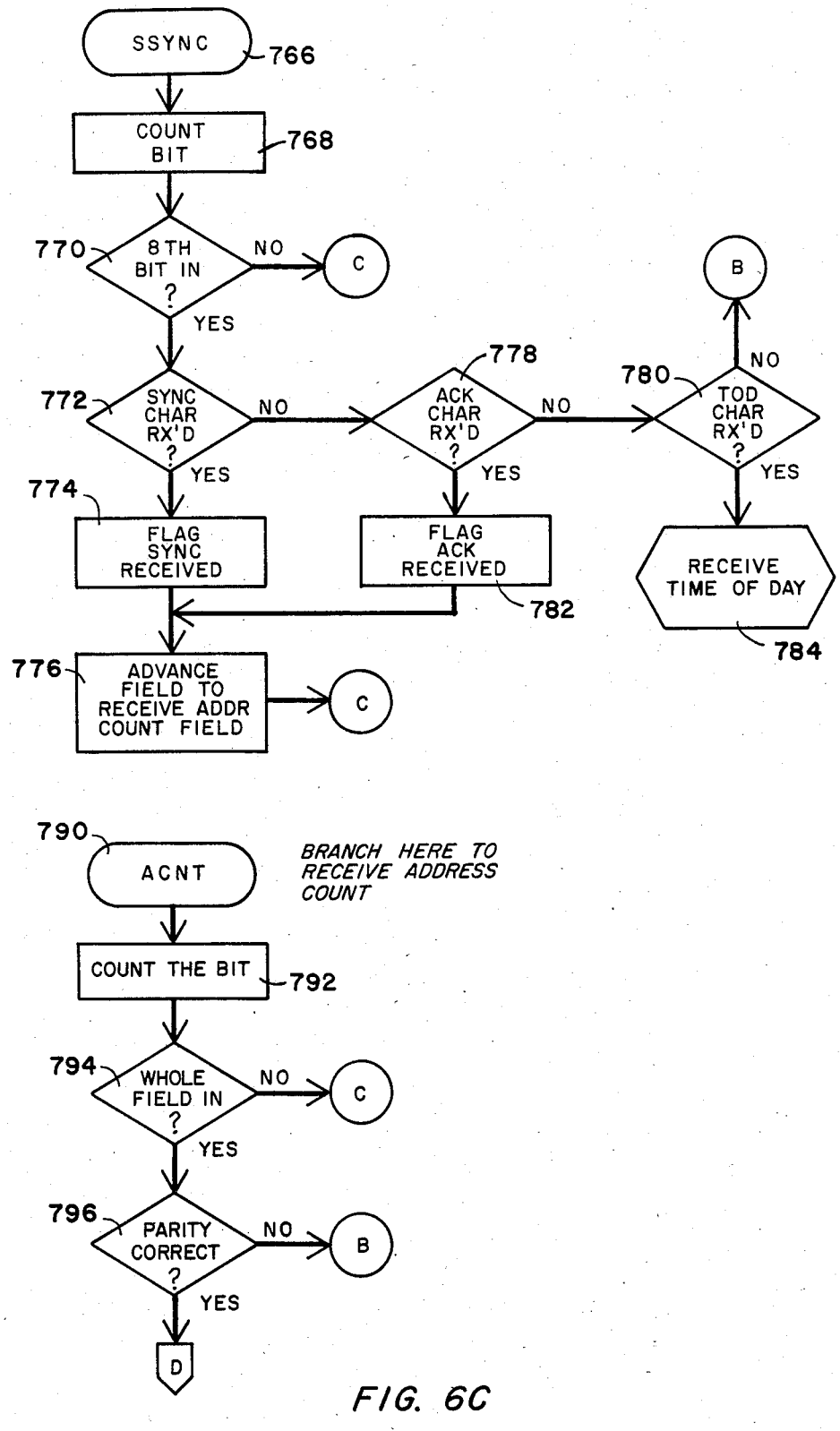
Figure 6D:
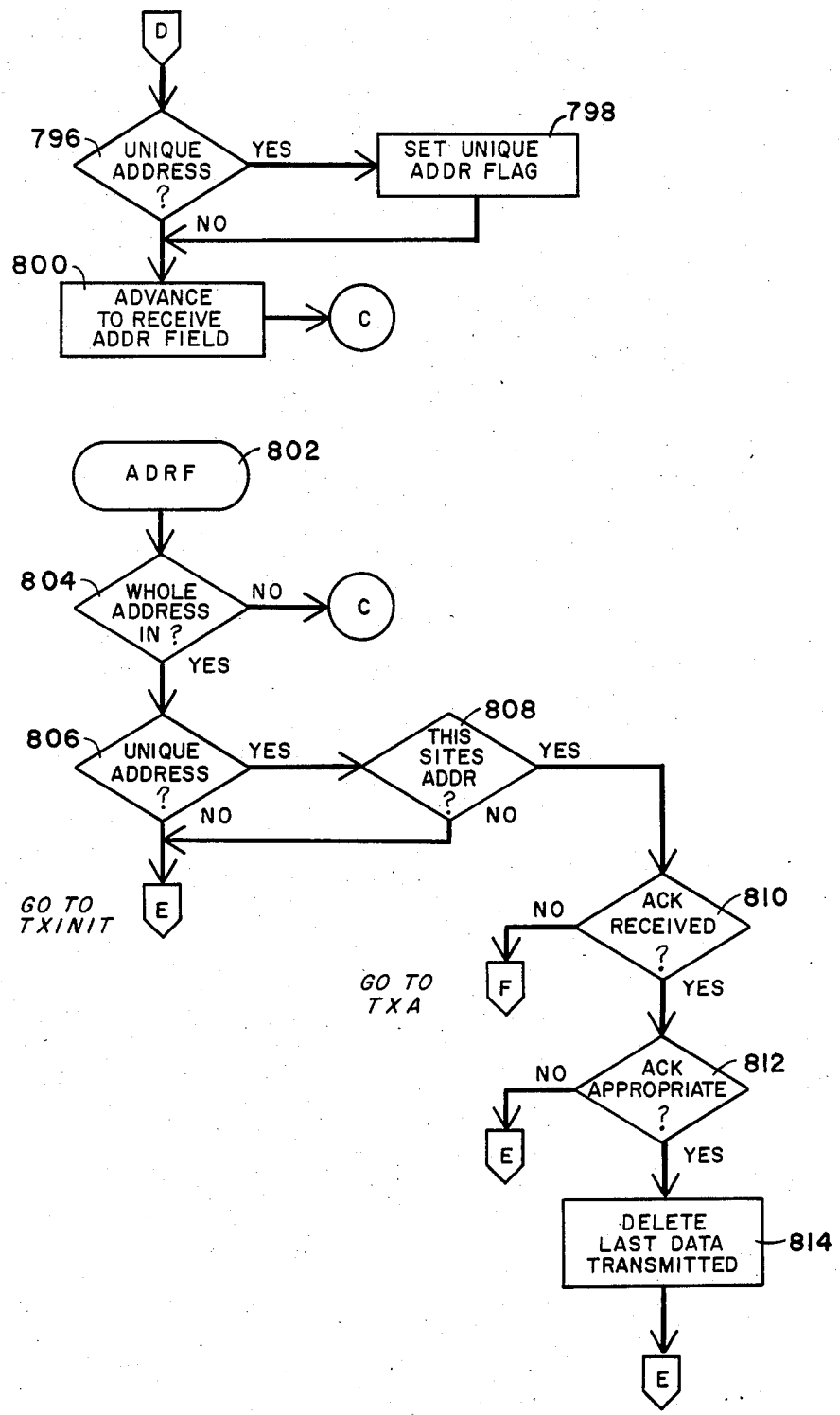
Figure 6E:
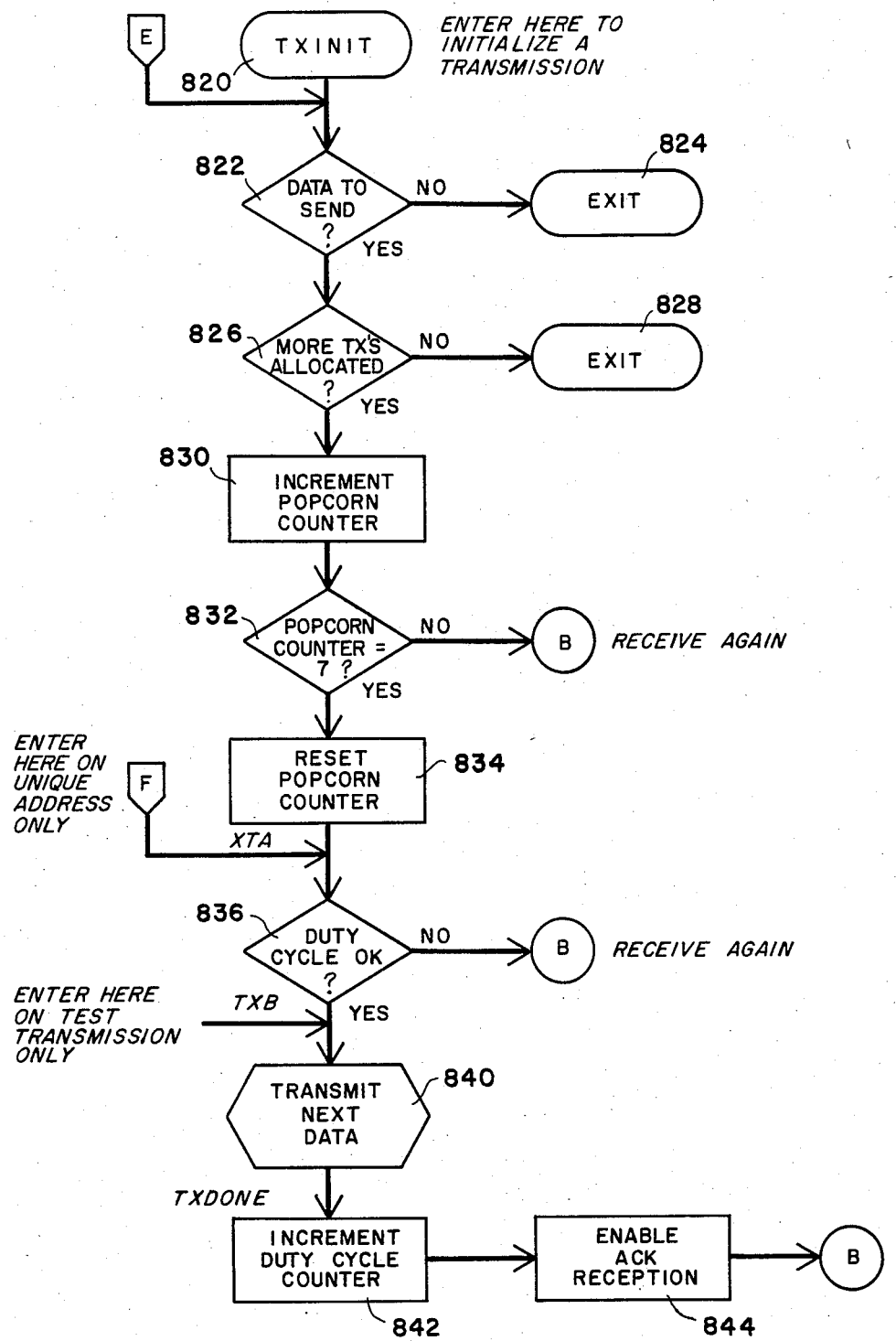
Figure 6F:
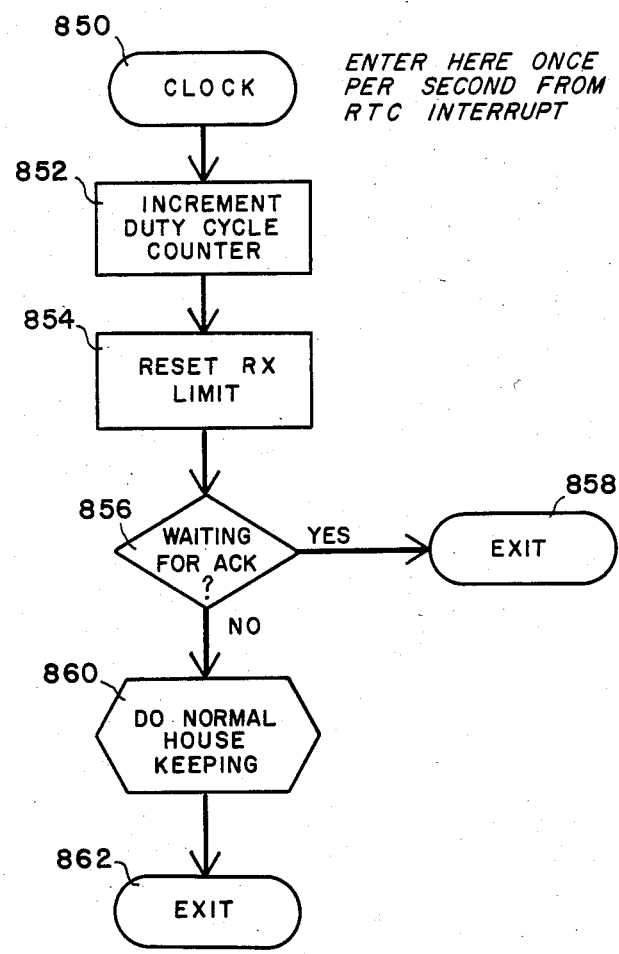
Figure 6G:
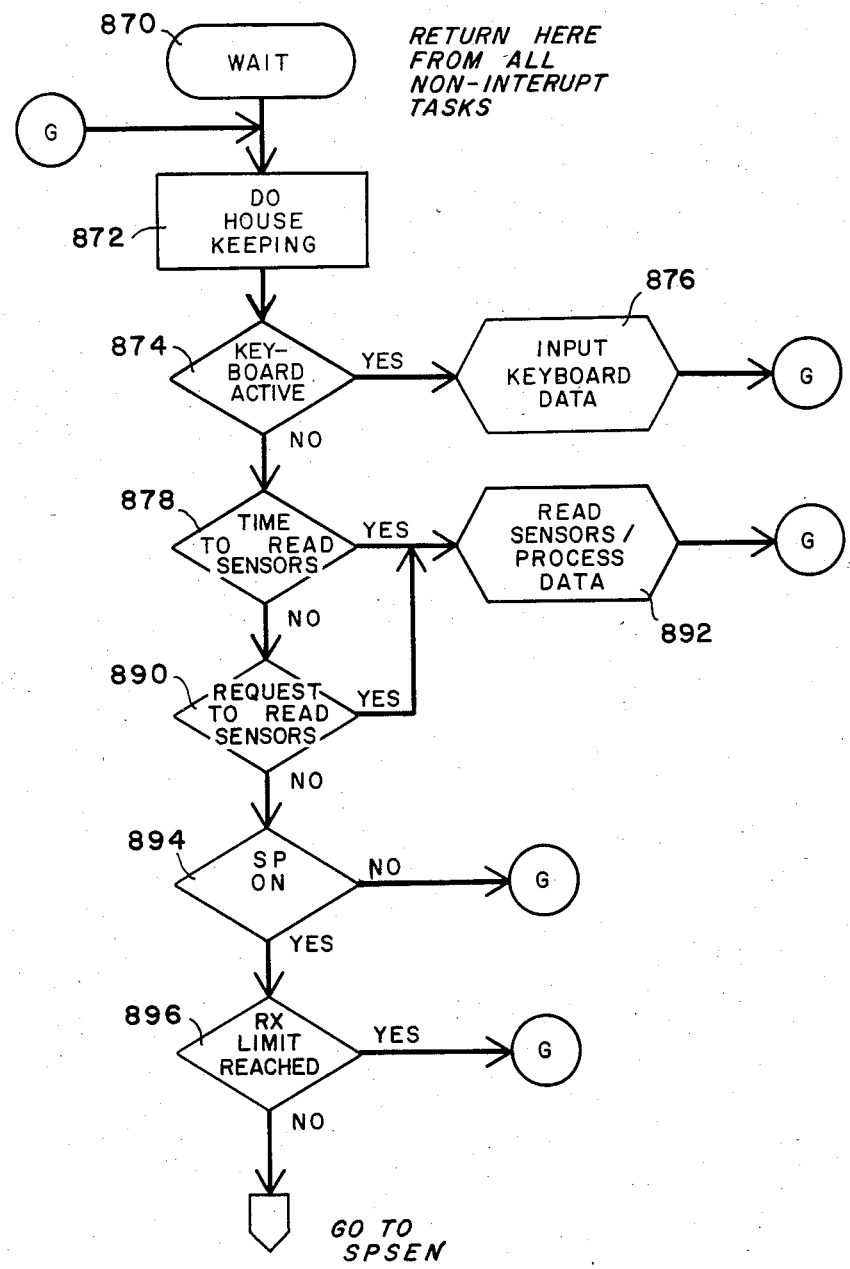

As explained above, the master and remote stations operate in a variety of modes in which control the operation of the communication system can be distributed between the remote and master stations. The manner in which control is distributed is determined by the characteristic of the probing signal sent by the master station 10. The various protocols of the probing signal sent by the master station 10 are illustrated in FIG. 5. The probe always includes a series of logic "1" bits followed by a synchronization pulse train or "field" of a predetermined character, such as Octal 28. The bits of "1"s allows the remote station to recover the clock from the received signal by the time that the sync field of the probe is received. The synchronization pattern allows the remote station to verify that the received signal is from a master station instead of either another station or noise or other interference. Following the synchronization bit pattern, a four-bit probe content indicator (PCI) is transmitted to designate the operating mode for the system. For example, a PCI code of "0" indicates an "idle" probe in which the remote stations are to utilize the probe only for establishing the existence of a usable meteor trail. A pulse code indicator of "1" indicates that the following message is the time of day. A PCI of 7 may designate an acknowledgement of a remote station transmission. A two-bit activity field then follows which selects one of two algorithms to be used by the remote station, depending upon whether high sensing activity or low sensing activity is desired. In the event that the probe content indicator designates that a specific remote station is being addressed, a ten-bit address will follow the two-bit activity field. The address field will be omitted for an idle probe since the probe will then be used only to determine the existence of a usable meteor trail. Finally, a seven-bit block check character is transmitted to indicate the number of bits in the address field so that the remote station can verify the accuracy of the field.

In the event that the probe content indicator designates an all-points broadcast, the block check character will be followed by a seven-bit message number identifying the content of a message by number and a number of seven-bit characters terminating in a seven-bit block check character for allowing the remote station to verify the accuracy of the preceding message.

In the event that the PCI designates a time-of-day broadcast, the master station follows the block check character with 14 bits identifying one of 365 days, 14 bits identifying one of 1440 minutes in a day, and 7 bits designating the second. A PCI of 5 allows the master station to act as a local relay in which it relays a transmission from one remote station to another remote station positioned at a line-of-sight location from the master station. Finally, a PCI of 5 allows the master station to send a message to a remote station when a remote station sends a probing signal that is used to establish the existence of a communications link.

The protocol of the remote station is somewhat similar to the protocol of the master station. The remote station always replies with a block of logic "1" bits followed by a six-bit synchronization pattern which allows the master station to verify that the received signal is from a remote station rather than from noise or other interference. A four-bit message content indicator then follows which, like the probe content indicator (PCI), designates the type of message following. The message content indicator is then repeated to maximize the accuracy of the transmitted data. A four-bit received message pointer (RXB) then follows to inform the master station how much of the previous message the remote was able to receive. This is important because a usable meteor trail can disappear at any time without the master station being able to determine at what point the communication link to the remote station terminated. The remote station then identifies itself in a ten-bit identification (RID) followed by a nine-bit remote check sum (CRCC) which allows the master station to verify the accuracy of the preceding data.

The characteristic of the data following the CRCC block depends upon the particular value of the MCI code. An MCI of zero indicates that no information is being transmitted, so the reply terminates with the CRCC. If sensor data is to be sent to the master station, the MCI is one and the reply continues with an eight-bit identification of date, a twelve-bit identification of the minutes, a four-bit code indicating the number of data blocks that will be sent corresponding to the number of sensors used, followed by one or more thirteen-bit blocks of data. The message then terminates with a nine-bit CRCC byte to allow verification of the accuracy of the preceding message.

Where a message is to be sent to the master station by the remote station, the ten-bit remote identification is followed by up to 24 seven-bit characters followed by a nine-bit CRCC block to allow accuracy verification.

The remote station is also capable of providing a statistical analysis of its performance, such as the number of probing signals received in a given period and the average length of the reception. The statistical message, which is designated by an MCI of 4, starts with a four-bit count designating the number of fields in the statistical message, followed by the corresponding number of thirteen-bit statistical fields. A nine-bit CRCC block allows verification of the preceding data.

The remote station may transmit commands to the master station manually generated by personnel at the remote site. Under these circumstances, a command text is transmitted, followed by a nine-bit CRCC block. The maximum length of the text is 64 bits. Any of these protocols is interpreted by the master station as an acknowledgement of the message previously sent by the master station. However, an MCI of 6 designates an acknowledgement without any additional data, in which case the reply terminates at the end of CRCC. Although a variety of protocols are illustrated in FIG. 5, the probing signal will generally be used solely to determine the existence of a usable meteor trail. The remote will then generally reply with sensor data information.

A flow chart of the software controlling the operation of the computer 46 in the remote stations 12 when receiving probe signals from a meteor burst master station 10 in the SNOTEL system is illustrated in FIG. 6.

Assuming an initial state with no signal path between the master 10 and remote 12, the program is entered at 702 when a probe signal is detected by the remote station 12, thereby causing the $R_xSP$ output of the receiver 42 (FIG. 2) to go high. The SPINT routine entered at 702 is an interrupt and suspends processing of any other task that may have been running. The interrupt is marked at 704 so that, after the interrupt routine is completed, the program will return the instruction it was executing when the interrupt occurred. Under circumstances where the probe signal is being continuously received by the remote station 12 (e.g., a continuous signal path exists between the master station 10 and remote station 12), the program is entered at 706 and a "wait loop" is marked for the return point of the program at 708. Thus, the program will exit to either the wait loop or the instruction being executed upon interrupt, depending upon how the program is entered.

In order to prevent the CPU from being totally occupied by its need to monitor the receiver 42 during continuous signal conditions (i.e., when a continuous signal path exists between the master station and remote station), which would prevent the CPU 200 from accomplishing other tasks, the program is limited to handling 512 bits/second. At a 2 kHz data rate, the CPU 200 will require about 25% of its time to monitor the receiver 42. Thus, a test is made at 710 to determine if the data rate is being exceeded. If the permissible data rate is being exceeded, the program exits via 712. Otherwise, the program tests at 714 if the receiver clock ($R_xCLK$) is active. Reception of an unmodulated signal the receiver 42 prevents the clock generator 142 (FIG. 2) from generating a clock. If $R_xCLK$ is not active, the program exits through 716. If the receiver clock is active, the program counts at 718 the number of times that a probe signal is detected by the receiver 42. A count is maintained of the probe signals to allow the remote station 12 to provide statistical data to the master station 10, as discussed above with reference to FIG. 5, and to update parameters governing whether the remote station 12 should reply to subsequent signals. The receiver limit is then set to 512 bits at 720. A routine that randomizes the reply characteristics of the remote station 12, and hence called a "popcorn" routine, is enabled at 722, and reception is initialized at 724 by clearing all appropriate variables and setting up a search for the "ONES" field in the probe signal. The CPU 200 is now ready to process the probe signal received by the receiver 42.

As mentioned above with reference to FIG. 5, the probe signal consists of a data field of nine "ONES," followed by a synchronization character (SYNC), followed by an address count and an address field. The remote station 12 must first search for the "ONES" field in order to resolve the receiver phase ambiguity discussed above. If the clock generator 142, in conjunction with the phase-lock loop 140 of the receiver 142, has locked up out-of-phase, the "ONES" will be received as "ZEROS." Other data in the probing signal will then be intermediate at any transition from a "ONE" to "ZERO" or a "ZERO" to a "ONE." Therefore, the CPU 200 must correct the phase of the clock generator 142 before the probing signal can be decoded.

As each data bit is output from the receiver 42 to the processor 200 on the $R_xDATA$ line, the CPU 200 detects the bit at 726. As the CPU 200 waits for each successive bit, it monitors the receiver's signal present, $R_xSP$, line at 728 to ascertain that the probing signal is still being received. If not, the program exits through 730. As each bit is input, it is accumulated in the received work and included in a parity check at 732. As each bit is received, the program branches through 734 to a routine corresponding to the type of data field to which the currently received bit belongs. Thus, for the initially received "ONES" field, the program branches to the HEAD routine, which is entered at 736. It is in this routine that the search for eight "ONES" or eight "ZEROS" is made by counting the consecutive occurrences of each. Thus, the first received bit is examined at 738 to determine if it is a "ONE" or a "ZERO." If it is a "ONE," the "ONE" increments a counter at 740 and the content of the counter is examined at 742. Until the eighth "ONE" is received, the program returns to 726 after each bit is received. When the eighth "ONE" is received, the routine proceeds to 744 to search for the first bit of the SYNC character (FIG. 5). If the first received bit is not a "ONE," the routine branches to 746 instead of 740. There, a counter is incremented by each "ZERO" bit received and the contents of the counter is examined at 748. As each "ZERO" bit is received, the rountine returns to 726 until the eighth "ZERO" is received, at which time the phase of the receiver clock is corrected at 750 before advancing to the synchronization field at 744. The CPU 200 directs the phase of the receiver clock at 750 by outputting an $RX\phi$ CORRECT signal to the clock generator 142 (FIG. 2). The routine for examining the synchronization field is entered at 760. The synchronization character is detected by first searching for a "ZERO" at 762. This is necessary as there may be an unknown number of "ONES" in the first field of the probing signal. As each bit is examined at 762 and found not to be a "ZERO," the program returns to 726 for processing of the next received bit. When a "ZERO" bit is received, the routine advances to search for the correct synchronization character at 764 before returning to 726 to process the next received bit.

From 764, the program searches for the actual SYNC character by entering a routine at 766. This is accomplished by inputing the bits of the synchronization character at 768 and testing for the eighth and final bit at 770. Until the eighth bit is received, the program returns to 726 as each bit is received. When the eighth bit is received, the identity of the received synchronization character is compared to the correct synchronization character at 772. If the correct synchronization character has been received, a flag is set at 774 to mark this condition, and the routine advances to receive the address count field (FIG. 5) at 776 before returning to 726 to process the first bit of the address count field. If the received synchronization character is not the correct synchronization character, the routine tests for the presence of the acknowledgement character ACK at 778 or the TOD character at 780. If the ACK character is detected at 778, a flag is set at 782 to mark this fact and the routine advances to receive the address count field through 776. If a time of day character is detected at 780, thereby indicating that the master station is transmitting the time of day, the routine branches to receive this message at 784.

Having received the synchronization or acknowledgement field, the routine next receives the address field in a routine entered at 790 to see if the specific station is being uniquely addressed or if the acknowledgement is being sent to the specific remote station. Each bit of the address is counted at 792, and the routine tests at 794 to determine if the entire address field has been received. If not, the routine returns to 726 to process the next message bit. If the entire address field has been received, the parity on the address field is checked at 795. If the parity is not correct, the routine returns to 714 above.

If the routine determines at 796 that the master station is uniquely addressing the specific remote station, a unique address flag is set at 798. The routine then advances to receive the address field at 800 before returning to 726.

The address field is received by a subroutine entered at 802. The number of bits received in the address field is tested at 804 to determine if the entire address has been received. Until the entire address has been received, the routine loops through 726 to process bits as they are received. When the entire address has been received, the routine checks at 806 to see if unique addressing is in effect. If so, a test is made at 808 to determine if the received address matches the address assigned to the remote station. If not, probe reception is complete and the routine proceeds to the transmit process described below. If the master station is calling that remote station, the routine checks at 810 to see if the unique address is an acknowledgement, and, if so, tests at 812 to determine if the acknowledgement immediately follows a previous transmission. If so, the data sent in the previous transmission has been accepted and understood by the master station and the remote station thus deletes it from its record of data to be transmitted at 814. The program then proceeds to the transmit routine.

The transmit routine is entered at 820 once the remote station has received the probing signal and has determined that a valid signal path exists to the master station. In the transmit routine, a check is first made at 822 to determine if it has data to transmit which the master station has not previously acknowledged as having received. If the remote station does not have any data to send, the transmit routine exits via 824. Thus, for example, the remote station may be programmed so that it posts data for transmission every hour. Under these circumstances, the remote station will reply to a polling signal as many times as necessary, within certain limits described below, until the master station has acknowledged receipt of such data.

Assuming that the remote station has data to send, the routine proceeds to 826 if the remote station has allocated any transmissions to itself. In order to prevent excessive battery drain and to prevent the remote station from transmitting excessively during conditions when the master station is not receiving properly, the number of remote station transmissions over a given period is limited. For example, 10 transmissions may be allowed for each 15 minute period accumulative to 50 transmissions. If the routine determines at 826 that no more transmissions have been allocated (i.e., 10 transmissions have been made during that 15 minute period or 50 transmissions have been made since an acknowledgement was received), the routine exits through 828.

If the remote unit has unallocated transmissions, the routine proceeds to 830, to a randomizing "popcorn" counter to determine if the remote station should reply to the currently received probing signal. The counter is thus incremented at 830 each time a probing signal is received. The rate at which the popcorn counter can be incremented at 832 is limited to further randomize the reply characteristics of the remote station. Thus, for example, the counter can be incremented up to four times/second, but in the event that transmission links are established at a faster rate, the popcorn counter is inhibited from being incremented. Also, the counter can be incremented at 832 at a specific rate for probing signals that persist longer than a predetermined value. Because the internal timing of each remote station is random, these operating characteristics further randomize the already random nature of the transmission links even when remote stations are positioned near each other.

The content of the counter is examined at 832, and, if the probing signal currently received is not the seventh probing signal since the previous transmission, the routine returns to 714. If the routine determines at 832 that the currently received probing signal is the seventh probing signal since the previous transmission, the popcorn counter is reset to "0" at 834. Thus, the randomizing popcorn counter allows the remote station to transmit data to the master station once for every seven transmission links established by appropriately positioned meteor trails. This allows the remote station to be located near other remote stations or within a line of sight of the master station and still timeshare the transmission link with other remote stations.

Program steps 820–834 are skipped if the remote unit determines that the master station is uniquely addressing that remote station. Instead, the transmit routine is entered at 836. The duty cycle is checked at 836 to make sure that the unit has not transmitted too many times in the last few seconds. Excessive transmission duty cycles cause the transmitter to overheat. The transmitter is limited to a 10% duty cycle under steady-state conditions. However, it can be operated at a higher duty cycle initially. Thus, the transmitter is allowed a burst of five transmissions in rapid succession, after which it is limited to one transmission/second. The number of transmission burst within this one-second period is incremented at the rate of one/second to a maximum of five. Thus, assuming that the remote stations's transmitter operates within the duty cycle limitations, data is transmitted at 840. The data transmission step at 840 is also the entry point for a service test transmission. At the end of the transmission, the transmitter is shutdown, the duty cycle counter is incremented at 842 and the receiver is enabled to receive an acknowledgement at 844. The routine then returns to the receive routine at 714 in an attempt to receive the acknowledgement reply from the master station. If the acknowledgement is received, the transmitted data is deleted from the record of data to be transmitted. If the standard probe is received by the remote station, it is assumed that the master station did not receive the previous transmission error-free and the process is once again repeated with the same data. If the signal is not reacquired, the acknowledgement enable is cleared and the routine exits.

The remote station's clock routine interacts with the receive/transmit routines by allocating receive and transmit limits and controlling the transmitter duty cycle. The clock routine is entered at 850 and a duty cycle control counter is incremented at 852. Also, the receive bit limit is reset to 512 at 854. The routine tests at 856 whether the remote station is waiting for an acknowledgement from the master station, and, if so, exits via 858. Because the clock routine may be interrupted at any time when the remote station is expecting an acknowledgement, the clock routine exits at 858 if the routine is waiting for acknowledgement. If not, the routine performs normal housekeeping functions at 860 and exits via 862.

When the remote station is idle, the routine continually loops in a "wait" loop, waiting for something to happen, as explained above with reference to FIG. 3. It is this feature which allows the CPU 200 and associated circuitry to draw relatively little power when it is not necessary for the CPU 200 to process information. In the wait loop, which is entered at 870, interrupts are enabled so that a receive signal present R$_x$SP or CLOCK INTERRUPT will cause direct branches to those routines. After the wait loop is entered at 870, some basic housekeeping tasks are accomplished at 872. The routine then tests at 874 to determine if an external keyboard connected to the remote station is active. If there is keyboard activity, the data is input to the CPU 200 at 876 before returning to 872. After the keyboard has been entered into the CPU 200, internal timers are checked at 878 to determine if external sensors should be read. The external sensors are normally read every fifteen minutes. If the time for reading the sensors has elapsed, or if a manual request to read the sensors is detected at 890, the sensors are read at 892. Finally, the wait loop looks to see if the R$_x$SP signal from the receiver is active at 894, thereby designating that the probing signal is being received. If the R$_x$SP line is not active, the wait loop is repeated through 872. If the probing signal is present at the receiver, and if the receive limit has not been reached as determined at 896, the wait loop exits and the program jumps to the receive routine at 702, as described above.

Figure 7A:
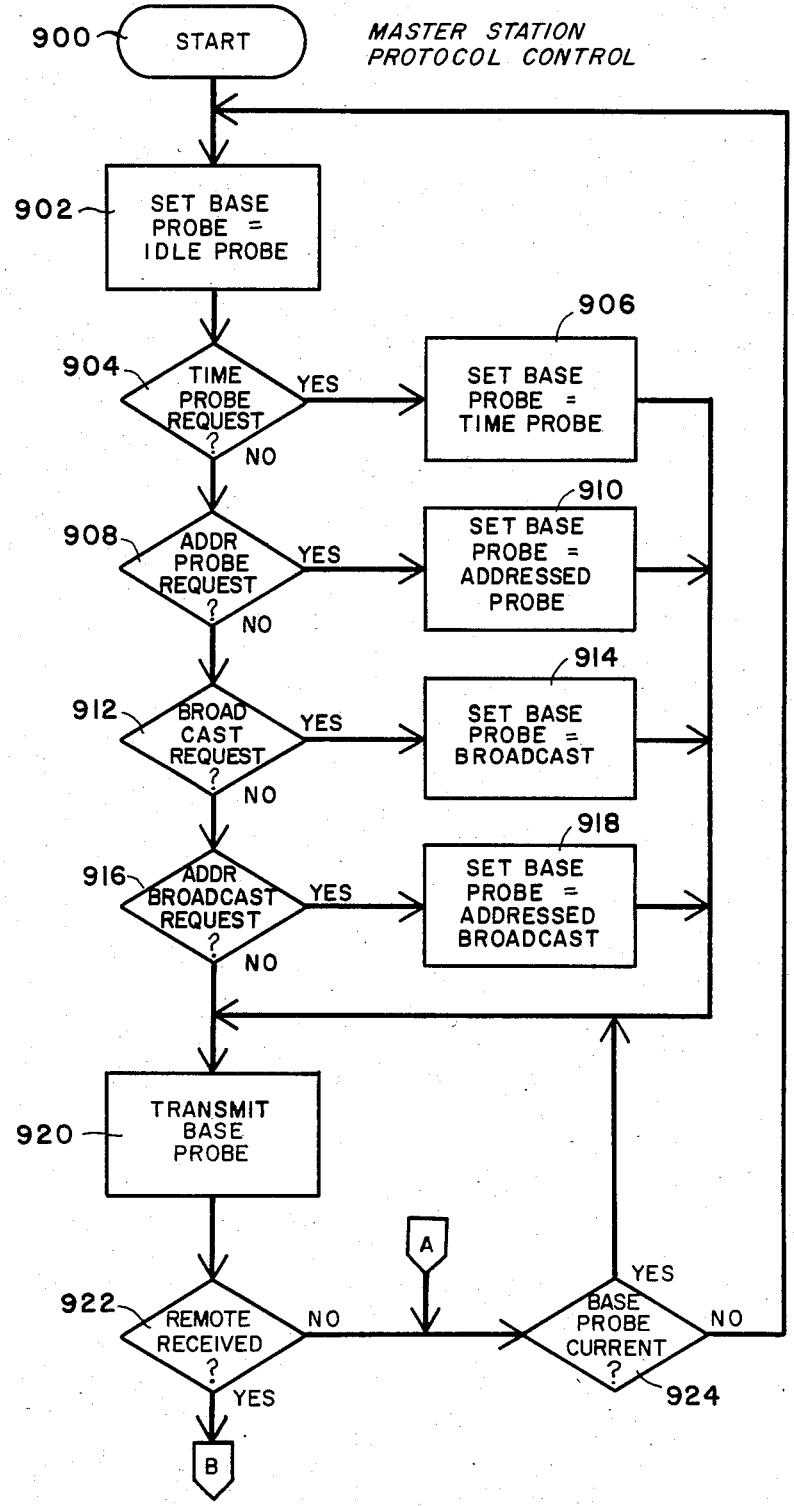
FIGS. 7A-7B are flow charts of the software for the master station.
Figure 7B:
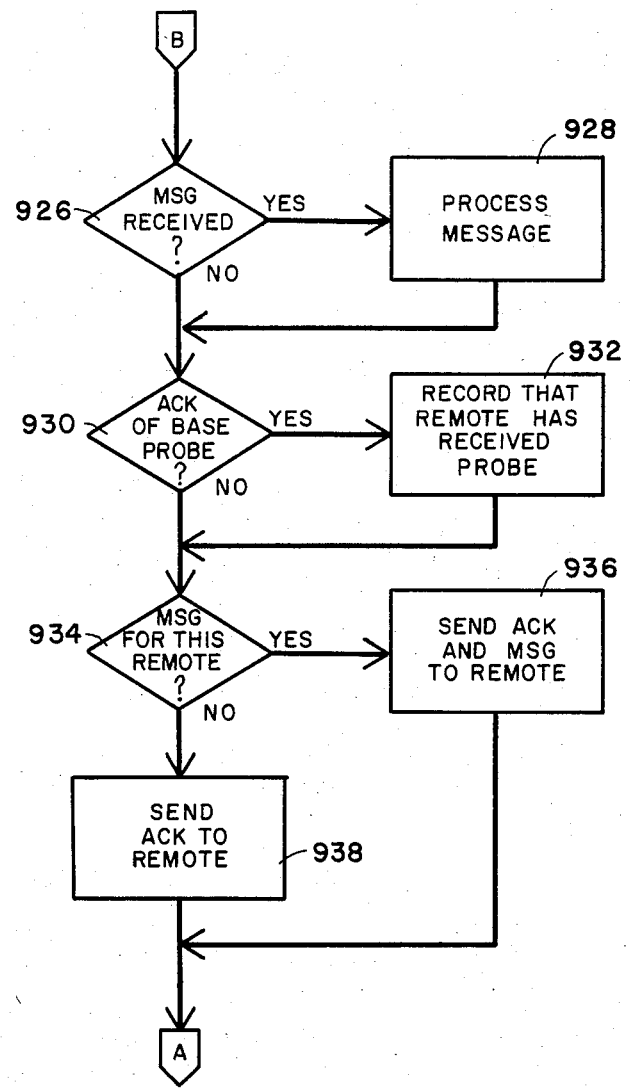

A flow chart for the master station is illustrated in FIG. 7. However, as emphasized above, the remote station can utilize the probing signal sent by the master station solely to determine the existence of a usable meteor trail. Thus, it will be understood that the master station described in U.S. Pat. No. 4,277,845, which is incorporated herein by reference, can be used with the remote station described herein.

The master station exercises some control over the communications protocol by controlling the probing signal that it transmits while waiting for a remote to respond, and the reply gives the response. The remote exercises control over the protocol by controlling the response that it can make to any of the master station's probing signals.

The master station program is entered at 900 when the master station selects the type of probing signal it will send. It initially selects the idle probe at 902, in which the probing signal is used solely to establish the existence of a communications link. The program then proceeds through a number of tests to determine if another type of probe is desired. Thus, at 904, the routine detects whether a time-of-day probing signal is manually requested or is required because a predetermined time has been reached. The master station recognizes the requirements for the time-of-day probe at 904 and selects it as the probing signal at 906. Upon operator command detected at 908, the master station program sets the probing signal to the address probed at 910. When a message is entered into the master station to be sent in the broadcast mode, this fact is detected at 912 and a probing signal selecting the broadcast mode is set at 914. If the broadcast message is to be addressed to a particular remote station, as detected at 916, the master station selects the probing signal for the addressed broadcast mode at 918.

Once a probing signal has been selected, the master station repetitively transmits the probing signal at 918 in search of a communication path to a remote station. When a remote station receives the probing signal, it transmits its response to the master station. Receipt of the response is detected at 920. While the master station is waiting for a remote station's response, the master station continuously determines at 922 that the selected probing signal is the current probing signal. It may, for example, time-out if it is a timed probe or it may be acknowledged by the addressed remote if it is an addressed probe. Also, the message being broadcast may be deleted by the operator.

When a remote reply is received by the master and detected at 920, the master station's program checks at 924 to determine if an entire message has been received from the remote station. If so, the message is processed at 926. The master station routine must also determine if the response constitutes an acknowledgement to the probing signal, and it does this at 928. For example, the routine determines at 928 if the remote responding is the particular remote station addressed by the probing signal, or, alternatively, if the response is from any remote if the probing signal was a general broadcast message. Assuming that the response is an acknowledgement, this fact is recorded at 930.

The master station software then determines at 932 if it has queued messages for the responding remote station. If it does, the routined proceeds to 934, where an acknowledgement message is transmitted to the received message and the next segment of any outbound message is transmitted. Otherwise, the routine merely proceeds to 936, where it simply transmits an acknowledgement to the signal received from the remote station. The master station software then returns to the transmit routine through 920 to continue transmitting the current probing signal.

Although anyone skilled in the art of computer programming can easily program a specific CPU using the flow charts illustrated in FIGS. 6 and 7, a set of object codes runnable on an IM6100CPU follows. The object code is specifically adapted for the SNOTEL meteor burst system described in U.S. Pat. No. 4,277,845. The program loads at memory location 4,000 Octal and the starting address is Octal 7777. The object code is:

```
4000  005424  002062  005660  001061  003145  001257  003056  001261
4010  003062  003061  005660  002062  005660  001061  007041  001145
4020  007640  005662  001145  007110  003145  001145  007041  001161
4030  007510  007041  001256  007710  005247  001162  007440  005243
4040  001145  003162  005662  007041  001145  007640  005254  001145
4050  003161  001162  007640  003152  003162  005662  007773  004013
4060  005246  007765  004146  005600  001301  003010  001302  003035
4070  001303  003410  002035  005270  001302  003035  001301  003010
4100  005305  000205  007760  000040  004105  004020  006250  007500
4110  005315  007200  004020  007623  005423  000345  003031  001031
```

```
4120 004020 005135 001031 001344 007650 005741 001342 001031
4130 007640 005334 001343 003031 001031 003410 002035 005305
4140 005741 007040 007763 000040 007643 000177 007200 003063
4150 003100 006307 001101 007650 005760 006001 005757 007745
4160 006526 005737 001125 003121 002121 005364 005426 001373
4170 004020 005135 005426 000040 007777 007777 007777 007777
4200 007421 001044 003073 003050 007701 004020 004217 007240
4210 003073 001050 007040 004020 004217 007200 005426 003036
4220 001036 003041 001073 003040 001041 007110 003041 007204
4230 007450 002050 005657 002040 005224 007200 001036 007110
4240 003036 001042 007010 003042 001042 002074 005252 003412
4250 001260 003074 003042 002073 005235 007200 005426 005000
4260 007764 004020 004676 001117 001313 007710 007325 003170
4270 001170 001117 007041 003035 001312 002035 005274 001170
4300 001117 003120 002135 004020 004553 003164 001160 007640
4310 005714 005425 000014 007762 006000 003006 007521 003005
4320 007204 003004 006301 006002 005725 006526 007240 001051
4330 003017 001417 004020 006600 004020 004167 005424 007777
4340 007777 007777 007777 007777 007777 007777 007777 007777
***
4400 007240 003035 007240 003412 001327 003074 001326 003073
4410 003042 007240 004020 004217 003065 003066 001326 003073
4420 001142 004020 004217 001330 003073 001172 007650 005232
4430 001067 007410 001103 004020 004217 003172 002035 007610
4440 005273 001135 007650 005261 001170 001117 007041 003035
4450 007240 003073 004020 004217 001326 003073 003135 001163
4460 005264 007344 003073 007325 004020 004217 001413 004020
4470 004200 002035 005266 001327 003073 007300 001065 000325
4500 007640 007120 001066 007004 007421 001065 007004 003043
4510 007701 004020 004217 001324 003073 001043 004020 004217
4520 003065 003066 005426 000022 007760 000010 007772 007764
4530 007766 001326 003044 001347 003412 002172 001350 005201
4540 001351 003012 001352 003412 002172 005200 000300 000246
4550 007757 000177 000064 001372 003012 001170 007041 001371
4560 003013 001120 001370 003412 001373 003044 005767 004401
4570 000073 000326 000251 007764 007777 007777 007777 007777
4600 001152 007650 005260 001275 001117 003036 001030 007650
4610 005225 003030 007100 001030 007061 001436 007430 007041
4620 001257 007700 005426 001436 003030 002147 007100 001436
4630 007061 001152 007620 005237 001436 003152 005247 007100
4640 001436 007061 001153 007630 005247 001436 003153 007100
4650 001436 001151 003151 007004 001150 003150 005426 007400
4660 007201 003147 001275 001117 003036 001436 003153 001153
4670 003152 001153 003151 003150 005426 000323 001152 007650
4700 005260 001160 007650 005426 001275 003015 001147 003041
4710 001151 007421 001150 004020 007000 003415 001153 003415
4720 001152 003415 005260 001347 006025 007200 006030 007450
4730 001345 003117 001346 006025 007200 001117 001344 007700
4740 005426 007307 003117 005426 007774 000020 001240 005240
4750 007777 007777 007777 007777 007777 007777 007777 007777
***
5000 003037 007100 001065 007010 003065 001066 007010 003066
5010 007430 001247 001065 003065 001065 000246 007640 005235
5020 001037 007650 005240 001065 000250 001250 000250 007421
5030 001065 000245 001246 007501 005242 001037 007650 005223
```

| | | | | | | | | |
|---|---|---|---|---|---|---|---|---|
|5040|001065|000251|003065|005644|004233|000002|000004|000010|
|5050|000011|000013|004020|004167|001333|004020|005135|001045|
|5060|004020|006600|004020|004167|001334|004020|005135|001116|
|5070|004020|006600|004020|007312|001331|004020|005135|001046|
|5100|004020|006600|004020|004167|001332|004020|005135|001047|
|5110|004020|006600|004020|007312|001106|004020|006600|004020|
|5120|004167|001113|007650|005424|001330|004020|005135|005424|
|5130|000304|000324|000301|000322|000323|007421|006000|007001|
|5140|003131|006002|007701|004020|007200|001131|007650|006001|
|5150|006301|007000|005426|004020|007312|005426|006021|001363|
|5160|006025|007200|005426|001240|007777|007777|007777|007777|
|5170|007777|007777|007777|007777|007777|007777|007777|007777|
|5200|007240|003101|003063|001155|007740|005752|001310|003055|
|5210|006313|007000|002045|006313|007410|005223|006213|005216|
|5220|002055|005213|005752|001306|003053|002155|007000|007240|
|5230|003034|006307|001267|003056|001265|003011|003061|003057|
|5240|003060|003102|001266|003055|007240|003075|007320|001061|
|5250|006212|005752|006313|005250|006312|007100|007430|002077|
|5260|007010|003061|002053|005456|005752|000230|007757|005270|
|5270|005311|005356|005345|005701|005702|005703|005357|005704|
|5300|005705|005400|006467|007117|005504|005512|007000|000120|
|5310|007766|006312|007610|005335|003057|002060|001060|001334|
|5320|007640|005246|006306|002056|007200|001332|003062|003061|
|5330|005246|007770|007740|007771|007770|003060|002057|001057|
|5340|001334|007640|005246|002056|005323|006312|005353|002062|
|5350|005246|005324|004146|002056|001333|005326|005323|001067|
|5360|007106|000070|001145|007640|005231|001773|007640|005231|
|5370|002056|005772|005524|000231|007777|007777|007777|007777|
|5400|002062|005703|001061|007041|007421|007501|001241|007650|
|5410|005234|007501|001242|007650|005236|007501|001240|007640|
|5420|005345|007201|003071|002056|001233|003062|003061|003077|
|5430|002116|006301|005703|007773|007326|005222|007325|005222|
|5440|002440|004440|006700|007240|001112|007640|005251|001067|
|5450|007410|001103|007106|000070|001145|007640|005701|001063|
|5460|007650|005701|002047|007000|003063|001112|007421|003112|
|5470|007701|007650|003113|001075|007640|005701|001102|005700|
|5500|005633|005600|004146|005246|002062|005703|002056|001077|
|5510|007040|005315|002062|005703|001077|007110|007620|005340|
|5520|001061|007104|007002|003411|001344|003062|003061|003077|
|5530|002055|005703|002106|007000|001343|003102|007240|003055|
|5540|007240|003075|005257|000002|007771|007501|001357|007640|
|5550|005760|001355|003056|001356|005225|004001|007765|001340|
|5560|005231|007777|007777|007777|007777|007777|007777|007777|
|5570|007777|007777|007777|007777|007777|007777|007777|007777|
|5600|001102|007450|001112|007440|005226|001113|007650|005755|
|5610|001072|007650|005755|002034|005753|001367|003034|002165|
|5620|005753|001366|003165|002072|007000|001113|007421|001115|
|5630|007640|005755|007701|007450|005755|001370|003056|001456|
|5640|003011|001411|007450|005312|007041|003062|001356|001062|
|5650|007710|005312|001362|001761|006305|007200|001137|007650|
|5660|005264|001364|006025|007200|002046|007000|001360|003057|
|5670|001411|003056|006213|005272|001056|007110|003056|007420|
|5700|005303|006316|007410|006317|002062|007410|005312|002057|
|5710|005272|005266|001363|006025|007200|001761|006305|007200|
|5720|002076|001076|001357|007710|005327|002115|002114|007410|

| | | | | | | | | |
|---|---|---|---|---|---|---|---|---|
|5730|003112|001365|007001|007440|005332|001354|003063|006212|
|5740|007410|005345|002063|005337|005755|002100|007346|001100|
|5750|007710|005753|005755|005231|007400|004146|000500|007773|
|5760|007764|006131|005000|001240|005240|007600|007771|007772|
|5770|005770|000300|000177|000251|000555|007777|007777|007777|
|6000|006007|001342|003010|001343|003012|001744|007041|003035|
|6010|001410|003001|001410|003002|001410|003412|002035|005214|
|6020|001327|006105|007200|001330|006115|007200|001331|006305|
|6030|007200|001332|006315|007200|001333|006205|007200|001334|
|6040|006215|007200|001335|006025|007200|001336|006035|007200|
|6050|001337|006045|007200|001340|006055|007200|001341|006314|
|6060|007200|006301|001345|004020|007270|007240|003054|006302|
|6070|007000|006303|007000|001375|003125|007326|003146|004020|
|6100|004723|006030|003103|001374|003142|004020|004540|003160|
|6110|007240|003165|007201|003136|006001|007300|003033|003137|
|6120|001346|003104|007344|003105|004020|007623|005425|004600|
|6130|003340|000243|002360|002640|002760|001240|007400|000000|
|6140|007760|006170|007607|000017|007622|000321|007773|007200|
|6150|001356|004020|005135|004020|007312|005424|000277|007777|
|6160|007777|007777|007777|007777|007777|007777|007777|007777|
|6170|005772|005773|006644|005201|000022|007717|007777|007777|
|6200|007200|001033|003051|001222|003036|001031|002036|007650|
|6210|005217|002036|001436|007041|007440|005205|005423|001436|
|6220|003036|005436|006223|000000|006147|000133|004064|000057|
|6230|004326|000123|005052|000124|006400|000122|006370|000121|
|6240|006000|000127|007600|000125|007400|000104|007455|000000|
|6250|007300|001321|003123|003132|006102|005306|001125|007130|
|6260|004020|004163|006102|005254|007621|004020|004162|007701|
|6270|007100|006102|007020|007010|007421|007002|002123|005265|
|6300|004020|004162|007701|007012|007012|005426|006301|006302|
|6310|005313|002127|002132|001132|001322|007750|005254|007240|
|6320|005426|007770|007742|004020|006250|007500|005333|007200|
|6330|004020|007623|005423|000344|003031|001031|004020|005135|
|6340|007346|003171|005743|007230|000177|001366|006025|007200|
|6350|004020|004163|006301|001136|006021|001041|006031|007200|
|6360|004020|004163|006301|004020|004163|005426|000240|000100|
|6370|003772|005773|000350|006000|007777|007777|007777|007777|
|6400|006002|007200|001266|003000|003101|007201|003137|007325|
|6410|005611|005633|006002|001265|003136|004020|006345|001136|
|6420|000262|003136|007344|003042|001264|003041|004020|007312|
|6430|006301|004020|007060|004020|006600|004020|004167|002042|
|6440|005243|004020|007312|001136|000262|007104|001263|006021|
|6450|003136|004020|004162|002041|005230|004020|005156|007201|
|6460|003136|005424|007770|000003|007774|000013|006412|002062|
|6470|005716|001077|007110|007620|005715|001061|007104|007450|
|6500|005715|007002|007112|007041|003062|001314|001062|003107|
|6510|003061|003070|002056|005716|000012|005231|005246|007200|
|6520|005323|007200|007001|004020|007312|005432|007300|006301|
|6530|001004|007010|001005|007421|001006|006001|005400|001372|
|6540|007001|007440|005340|001371|003121|007100|006032|007120|
|6550|007010|006037|007000|006036|002121|005345|007421|007307|
|6560|007041|003121|006037|007000|006036|002121|005362|007701|
|6570|005426|007764|007000|007777|007777|007777|007777|007777|
|6600|003036|001222|003035|001036|007006|007004|003036|001036|
|6610|007004|000221|001220|004020|005135|002035|005203|005426|
|6620|000260|000007|007774|003007|002027|001020|007001|003427|
|6630|001420|003020|001007|005420|003007|001427|003020|007060|
|6640|001027|003027|001007|005420|001127|007041|003127|001352|

```
6650  003155  001076  007450  005262  001356  003076  001076  001357
6660  007710  003115  002054  005343  001354  003054  003156  001113
6670  007650  005277  003110  007240  001163  003163  002164  001162
6700  007640  002162  001171  007650  007410  002171  001067  003067
6710  002161  001161  001353  007640  005323  003161  006030  003103
6720  007325  003146  002160  002157  001157  001357  007640  005333
6730  003157  007201  003146  002110  001110  001354  007640  005343
6740  003110  007326  003146  001127  007650  005751  002127  007000
6750  005251  006526  007773  005140  007704  007750  007777  007761
6760  007777  007777  007777  007777  007777  007777  007777  007777
***
7000  003042  001041  007450  005426  007041  003041  003043  007100
7010  007701  001041  007421  001042  007650  005225  007020  007204
7020  007041  001042  003042  002043  005207  007204  007440  005223
7030  001041  007041  003041  007701  001041  007421  001043  005426
7040  001257  003013  006002  001256  003012  004020  004531  001255
7050  003114  007201  003112  006001  005424  007324  000300  000205
7060  001314  003124  001316  003121  006026  006022  007410  005304
7070  001315  003124  001316  003121  006022  005304  006027  007200
7100  006020  006023  007000  005426  006301  006302  007410  002127
7110  002121  005524  006027  005426  007065  007074  000100  001070
7120  007130  003070  002062  005761  002056  001061  007041  003145
7130  007344  001071  007650  005761  007240  001071  007650  005345
7140  007346  001071  007650  005762  005764  001107  007640  005763
7150  001103  007106  000070  001145  007640  005764  007325  005760
7160  005626  005246  005443  005600  005231  007777  007777  007777
7170  007777  007777  007777  007777  007777  007777  007777  007777
7200  000226  001225  007104  007421  001227  003122  007701  007010
7210  007430  005214  006107  007410  006106  007421  004020  004162
7220  002122  005206  004020  004162  005426  000400  000377  007766
7230  001031  001264  007710  005240  001031  001265  007710  005254
7240  001031  001266  007640  005662  001267  003104  001033  003052
7250  003033  002105  005663  005423  002104  005257  005423  004020
7260  007472  005663  006200  006323  007720  007710  007724  007773
7270  007041  003003  001310  001711  007650  005426  001306  003010
7300  003410  002003  005300  001307  003711  005426  000027  005252
7310  002526  000350  001330  003036  001327  003064  001331  004020
7320  005135  001332  004020  005135  002036  005322  005426  007660
7330  007772  000215  000212  007777  007777  007777  007777  007777
7340  007777  007777  007777  007777  007777  007777  007777  007777
***
7400  004020  007623  006002  004020  007632  004020  007521  005230
7410  006002  004020  007632  004020  007521  006301  007346  001146
7420  007650  005224  004020  004600  007240  001146  007650  005233
7430  001254  003113  003115  007240  003163  001252  001072  003072
7440  001253  001072  007700  005247  001253  007041  003072  003146
7450  006301  005670  007766  000062  000003  001051  007041  001271
7460  001117  003036  001436  004020  006600  004020  004167  005424
7470  004261  000327  001031  000303  007421  001033  007104  007106
7500  007501  003033  005426  000007  006002  001316  006115  007200
7510  001320  004020  005135  007201  003130  005717  003740  006323
7520  000052  001350  001117  003056  007346  003057  004020  007312
7530  001456  004020  006600  004020  004167  007240  001056  003056
7540  001056  007041  001350  007650  005426  002057  005330  005324
7550  000326  007777  007777  007777  007777  007777  007777  007777
```

```
 7560  007777  007777  007777  007777  007777  007777  007777  007777
***
 7600  007240  001052  003017  001051  003417  004020  004540  005424
 7610  005402  004315  000000  005422  006623  006147  006114  007712
 7620  006634  000352  000010  003130  001631  006115  007200  006001
 7630  005426  006130  001117  007041  003035  001310  003016  003416
 7640  002035  005237  001310  003016  007240  001117  003041  004020
 7650  006345  001041  006031  006301  007300  006033  005262  004020
 7660  007060  005264  004020  006537  003031  007201  001031  007640
 7670  005275  004020  004163  004020  004163  001031  003416  001041
 7700  007450  005305  001311  003041  005251  004020  005156  005426
 7710  000326  007777  007200  006301  001357  003027  001130  007640
 7720  005753  006102  005324  005754  001164  007640  005760  006001
 7730  006301  006030  007104  007620  005337  007325  003146  001146
 7740  007640  005756  006212  007410  005351  006001  006301  006310
 7750  005312  006002  005755  006323  007504  005200  007410  000352
 7760  004261  007777  007777  007777  007777  007777  007777  007777
 7770  007777  007777  007777  007777  007777  007777  006000  005776
```

I claim:

1. A system for communicating between a master station and a plurality of remote stations, comprising:
a master station processing unit selectively generating a digital probe signal, a master station transmitter generating an RF probing signal corresponding to said digital probe signal, and a master station receiver adapted to detect RF signals; and
a remote station receiver for each of said remote station, said remote station receiver detecting said RF probing signal when a meteor trail is present at the proper location and providing an enabling signal in response thereto indicative of the existence of a communication path between said master station and the respective remote station, a data generating device for each remote station providing respective digital data signals indicative of information generated at such remote station, processing means for each remote station determining in response to said RF probing signal whether, based upon factors specific to each remote station, said remote station should respond independently of any information contained in said RF probing signal that prompts a response from an identified remote station and for generating a trigger signal in response to a determination to respond, a transmitter for each remote station generating an RF reply signal for such remote station in response to said trigger signal, and a modulator connected to said data generating device and said transmitter for encoding said RF reply singals with said digital data signals.

2. The communication systems of claim 1 wherein said processing means determines whether to respond to said enabling signal by examining whether data signals are available from said data generating device and inhibits the generation of said trigger signal in response to a determination that said data signals are unavailable.

3. The communication system of claim 1 wherein said processing means includes counting means for counting the number of probe signals detected by said remote station receiver and generates said trigger signal after said counter means reaches a predetermined number.

4. The communication system of claim 3, further including means for limiting the rate at which said counting means can increment in response to rapidly occuring probing signals, thereby increasing the random nature of the tranmission of said remote receiver.

5. The communication system of claim 3, further including means for incrementing said counter means at a fixed rate in response to continuously occurring probing signals, thereby increasing the random nature of the transmissions of said remote receiver.

6. The communication system of claim 1 wherein said processing means determines whether to respond to said enabling signal by counting the number of RF reply signals transmitted by remote station within a predetermined period in order to prevent excessive discharge of a battery powering said remote station.

7. The communication system of claim 1 wherein said probing signal includes a message containing information to be communicated to at least one of said remote stations, and wherein the RF reply signal transmitted by each remote station includes an identifying code uniquely identifying said remote station, said master station further including acknowledgement means recording the identifying code in each RF reply received by said master station to determine if all remote stations have received said message.

8. The communication system of claim 7 wherein said master station continues to transmit said message until the identifying code for all remote stations have been received by said master station.

9. The communication system of claim 7 wherein said message designates the current date and time of day, and wherein said remote station further includes timer means generating an output indicative of the date and time of day, said timer means being re-settable to the date and time of day designated in a message of a probe signal.

10. The communications system of claim 1 wherein said processing means further includes statistical recording means for recording a plurality of operating parameters of each remote station and providing digital data signals indicative thereof, said remote station generating an RF reply signal indicative of said operating parameters upon receipt of a probe signal containing a coded request for such statistical information.

11. The communications system of claim 1 wherein said processing means further includes means for causing said remote station to transmit an RF reply signal without first receiving an RF probing signal from said master station, said master station responding to said RF reply signal upon receipot, thereby indicating the existence of a communication path between said remote and master stations.

12. A meteor burst communication system comprising:
at least one master station, including a radio transmitter for transmitting digital probing radio signals for reflection from meteor vapor trails, and a receiver for receiving digital reply radio signals; and
a plurality of remote stations positioned at locations remote from said master station, each of said remote stations including a data generating device generating digital reply data signals indicative of information originating at said remote station, a radio receiver receiving said digital probing radio signals from said master station after said digital probing radio signals have been reflected from a meteor trail, a processing means for deciding whether, based upon factors specific to each remote station, to respond to said digital probing radio signals detected by said receiver independently of any information contained in said digital probing radio signals that prompts a response from an identified remote station and a radio transmitter for transmitting said digital reply radio signals for reflection from the meteor vapor trail reflecting said digital probing radio signals to said master station responsive to a decision by said processing means to respond, said radio transmitter containing a modulator that is connected to said data generating device for modulating the output of an oscillator within said radio transmitter with said digital replay data signal to generate said digital reply radio signal so that the information originating at said remote station can be communicated to said master station.

13. A remote station for use in a meteor burst communication system, said remote station comprising:
an RF receiver generating an enabling signal in response to receipt of an RF signal;
a data generating device providing digital data signals indicative of information;
processing means for said remote station for determining in response to said enabling signal whether, based upon factors specific to said remote station, said remote station should respond independently of any of the information contained in the received RF signal and for generating a trigger signal in response to a determination to respond; and
a transmitter generating an RF signal, said transmitter containing a means for encoding said digital data signals into said RF signal in response to said trigger signal, and said RF signal encoded with said digital data signals.

14. The remote station of claim 13 wherein said processing means determines whether to respond to said enabling signal by examining whether data signals are available from said data generating device and inhibits the generation of said trigger signal in response to a determination that said data signals are unavailable.

15. The remote station of claim 13 wherein said processing means includes counting means for counting the number of said RF signals detected by said receiver and generates said trigger signal after said counting means has incremented to a predetermined number.

16. The remote station of claim 15 further including means for limiting the rate at which said counting means can increment in response to receipt of such RF signals faster than a predetermined rate.

17. The remote station of claim 15, further including means for incrementing said counting means at a fixed rate in response to a continuously received RF signal.

18. The remote station of claim 13 wherein said processing means determines whether to respond to said enabling signal by counting the number of RF signals transmitted by said transmitter within a predetermined period in order to prevent excessive discharge of a battery powering said remote station.

19. A method of communicating between a master station and a plurality of remote stations, comprising:
transmitting an RF digital probe signal from said master station for reflection from a suitably positioned meteor trail;
receiving said RF digital probe signal at each remote station if a meteor trail is present at a location that provides a signal path between said master and remote stations;
deciding at each remote station whether to respond to said RF digital probe signal actually received at such remote station by examining factors relating to such remote stations or to the remote station identifying information of such remote station so that said remote stations decide whether to respond independently of each other and any remote station identifying information contained in said RF digital probe signals; and
responding to a decision to reply to said RF digital probe signal by transmitting an RF reply signal to said master station by reflection from the same meteor trail that reflected said RF digital probe signal from said master station to said remote station.

20. The method of communicating of claim 19 wherein said RF reply signal contains coded data signals indicative of information available at said remote station.

21. The method of communicating of claim 20 wherein said decision to respond to said RF digital probe signal actually received at said remote station is made by examining whether data signals are available at said remote station and deciding not to respond in the event that said data signals are unavailable.

22. The method of communicating of claim 19 wherein said decision is respond to said RF digital probe signal actually received at said remote station is made by counting the number of times that said RF digital probe signal is actually received at said remote station and deciding not to respond until said RF digital probe signal has actually been received at said remote station a predetermined number of times.

23. The method of communication of claim 19 wherein said decision whether to respond to said RF digital probe signal actually received at said remote station is made by counting the number of said RF reply signals previously transmitted from said remote station within a predetermined period.

24. The method of communicating of claim 19 wherein said probe signal includes coded information to be communicated to at least one remote station and wherein the RF reply transmitted from each remote station includes an identifying code uniquely identifying said remote station, said method further including the step of noting at said master station the identity of each remote station responding to said probe signal to determine if all remote stations have received said message.

* * * * *

UNITED STATES PATENT AND TRADEMARK OFFICE
CERTIFICATE OF CORRECTION

PATENT NO. : 4,630,314

DATED : December 16, 1986

INVENTOR(S) : Dale K. Smith

It is certified that error appears in the above—identified patent and that said Letters Patent is hereby corrected as shown below:

Col. 33, line 54, change "singals" to --signals--

Col. 34, line 24, change "occuring" to --occurring--

Col. 34, line 25, change "tranmission" to --transmission--

Col. 34, line 49, change "code" to --codes--

Col. 35, line 2, change "receipot" to --receipt--

Col. 35, line 34, change "replay" to --reply--

Signed and Sealed this

Twentieth Day of October, 1987

Attest:

DONALD J. QUIGG

*Attesting Officer*  *Commissioner of Patents and Trademarks*